United States Patent [19]
Hancock

[11] Patent Number: 5,227,786
[45] Date of Patent: Jul. 13, 1993

[54] INSIDE/OUT PERSPECTIVE FORMAT FOR SITUATION AWARENESS DISPLAYS

[75] Inventor: William R. Hancock, Phoenix, Ariz.

[73] Assignee: Honeywell Inc., Minneapolis, Minn.

[21] Appl. No.: 929,468

[22] Filed: Aug. 13, 1992

Related U.S. Application Data

[63] Continuation-in-part of Ser. No. 649,118, Jan. 28, 1991, abandoned, which is a continuation-in-part of Ser. No. 374,420, Jun. 30, 1989, abandoned.

[51] Int. Cl.⁵ ............................................. G08G 5/04
[52] U.S. Cl. ..................................... 340/961; 342/29; 364/439; 364/461
[58] Field of Search .............. 340/945, 961, 963, 971, 340/980, 974; 364/439, 441, 460, 461; 342/36, 38, 29, 30, 455

[56] References Cited

U.S. PATENT DOCUMENTS

| | | | |
|---|---|---|---|
| 2,994,867 | 8/1961 | Pierce | 342/29 |
| 3,150,364 | 9/1964 | Green, V | 342/29 |
| 3,300,778 | 1/1967 | Vickers | 342/30 |
| 3,611,371 | 10/1971 | Morse . | |
| 4,380,050 | 4/1983 | Tanner . | |
| 4,403,220 | 9/1983 | Donovan | 342/29 |
| 4,463,380 | 7/1984 | Hooks, Jr. . | |
| 4,513,374 | 4/1985 | Hooks, Jr. . | |

FOREIGN PATENT DOCUMENTS

| | | |
|---|---|---|
| 3210694 | 3/1982 | Fed. Rep. of Germany . |
| 1076574 | 7/1967 | United Kingdom . |

OTHER PUBLICATIONS

*Scientific American*, Jun. 1944, pp. 256–258, "Electronic Aviation", Vin Zeluff.
"Aviation Instruments", *Instruments*, Apr. 1945, pp. 237–238, 240, Glen Gilbert.
Avionics, *IEEE Spectrum*, "The Promise of Air Safety", Jul. 1975, pp. 26–36.
"United Airlines T/CAS Tests", *Aviation Week & Space Technology*, Nov. 21, 1988, pp. 133, 135, 137.
"Operator Performance as a Function of Type of Display: Conventional versus Perspective," by Bemis et al. and published in Human Factors, 1988, 30(2) at pp. 163–169.
"Perspective Traffic Display Format and Airline Pilot Traffic Avoidance," by Ellis et al. and published in Human Factors, 1987, 29(4) at pp. 371–382.

*Primary Examiner*—Jin F. Ng
*Assistant Examiner*—Brent A. Swarthout

[57] ABSTRACT

A traffic information display format, situated in a craft, for observing traffic in a volume about the craft, having one or more viewing grids that display traffic on the display in a three-dimensional perspective so that the observer of the display can conceptually and immediately perceive the traffic entities and their statuses, distances, altitudes, ascending rates, descending rates, closing rates, receding rates and other information. The formats are generated by situation and symbol computers and provided to a stroke or flat panel display. The computers follow a system flow design that results in symbol and format generation for a display.

6 Claims, 9 Drawing Sheets

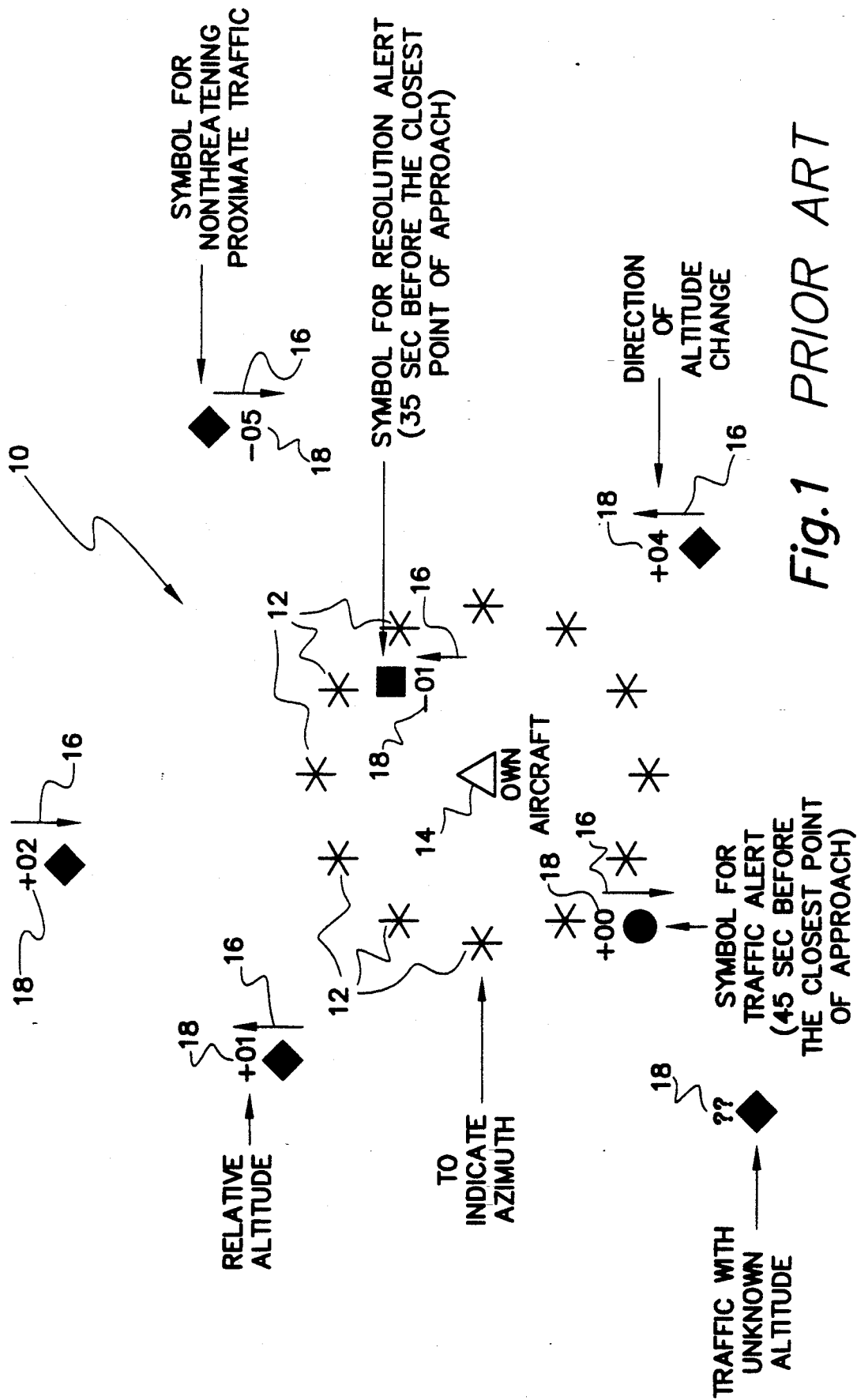

INSIDE/OUT PERSPECTIVE FORMAT FOR SITUATION AWARENESS DISPLAYS

This application is a continuation-in-part of application Ser. No. 07/649,118, filed Jan. 28, 1991, now abandoned, which was a continuation in part of application Ser. No. 374,420, filed Jun. 30, 1989, and now abandoned.

FIELD OF THE INVENTION

The present invention pertains to air traffic displays and particularly to display formats for an air traffic alert and collision avoidance system (TCAS). More particularly, the invention pertains to TCAS display formats having three-dimensional perspective color graphics.

BACKGROUND OF THE INVENTION

The function of the TCAS display is to present air traffic information, declare threats, and provide advisories on potential air traffic conflicts before the closest point of approach. The TCAS display of the related art uses two-dimensional graphics to convey traffic information in the own aircraft's own protected volume of airspace. However, since two-dimensional graphics can only depict information on two (X- and Y-axes) of the three dimensions required to completely represent spatial traffic relationships for TCAS (X-, Y-, and Z-axes), numerics are used to portray relative altitude on the Z-axis. This two-dimensional plan view display of the TCAS traffic information (supplemented with numeric data tags for the third dimension, altitude) does not provide a direct visual display of the dynamic spatial relationships existing between air traffic in the natural three-dimensional airspace. Interpretation of such a display requires considerable time and mental effort, in that it requires pilots to mentally construct a three-dimensional image of the traffic situation by combining graphically displayed azimuth and range information with numerically presented altitude information.

The related art TCAS display, therefore, is limited to function as an aid to direct visual acquisition of target aircraft, rather than as a correct, veridical, and easily interpretable complete "picture" of the current traffic situation. Pilots simply use the presented information as a cue for visual search to locate potential threats by direct visualization of aircraft outside the cockpit. Furthermore, since the traffic information is dynamic and continuously updated, direct visualization will require pilots to continuously alternate their attention from reading the numerics on the head-down TCAS display to the head-up search up for aircraft outside the cockpit. Thus, using the related art TCAS display, pilots often find it time-consuming and confusing to visually acquire and process dynamic changes in the air traffic situation under moderate or high cockpit workload situations.

Attempts of the related art to solve the problems of indirect visualization of conventional displays have focussed on basic symbology refinement for the two-dimensional TCAS display format. Efforts have been made to reduce confusion and misinterpretation by modifying the symbols. For example, all the numeric codes were initially displayed above the aircraft symbol with a "+" or "−" sign to indicate relative elevation. The most current baseline TCAS display presents the numerics either above or below the symbol for conceptual compatibility. No effort has been made to explore other innovative approaches or to empirically validate current design concepts. However, research on display formats for other applications reveals potential benefits of an innovative three-dimensional perspective format. Ground-based perspective traffic display formats have been studied in the related art to demonstrate the advantages of utilizing perspective graphics for portraying complex spatial situations. Additionally, perspective displays for naval battlefield management systems have been previously studied to examine the feasibility and advantages of three-dimensional graphic presentations. Such studies have shown significant advantages of three-dimensional formats over two-dimensional formats.

SUMMARY OF THE INVENTION

The present invention relates to formats for the display of data in an airborne environment to assist the pilot in being more cognizant of the conditions in his or her airspace, thereby enhancing his or her situational awareness. This format is specifically designed for the Traffic-Alert and Collision Avoidance System (TCAS), in which air traffic information in a protected three-dimensional volume of airspace surrounding an aircraft is presented with respect to that aircraft. The present invention implements three-dimensional perspective graphics in color to display easily and directly interpretable dynamic spatial relationships for the TCAS system. This format is equally applicable to military situation awareness formats where the pilot needs to quickly and accurately recognize what traffic and targets are in the surrounding airspace.

The invention uses three-dimensional perspective graphics rather than a two-dimensional format supplemented with numeric data tags. The advantages of the present invention are: the realistic and intuitive portrayal of traffic information in three-dimensional perspective that results in the correct perception of the three-dimensional airspace; appropriate use of color, shape and size coding that is compatible with the pilots' expectations; and the integration of displayed situational information to facilitate rapid interpretation by pilots. The primary objectives of this new display format are: to enhance the speed and accuracy of pilot's understanding of the egocentric traffic situation; to minimize complex cognitive processing and pilot mental workload; and to allow pilots to preview and plan evasive maneuvers earlier and more effectively in order to avoid potential air traffic conflicts. Therefore, the function of the TCAS display is greatly extended and is no longer limited to cueing for visual acquisition of traffic outside the aircraft.

BRIEF DESCRIPTION OF THE DRAWINGS

FIG. 1 shows the previously developed two-dimensional TCAS display format of the related art.

DESCRIPTION OF THE PREFERRED EMBODIMENT

Figure 2A:
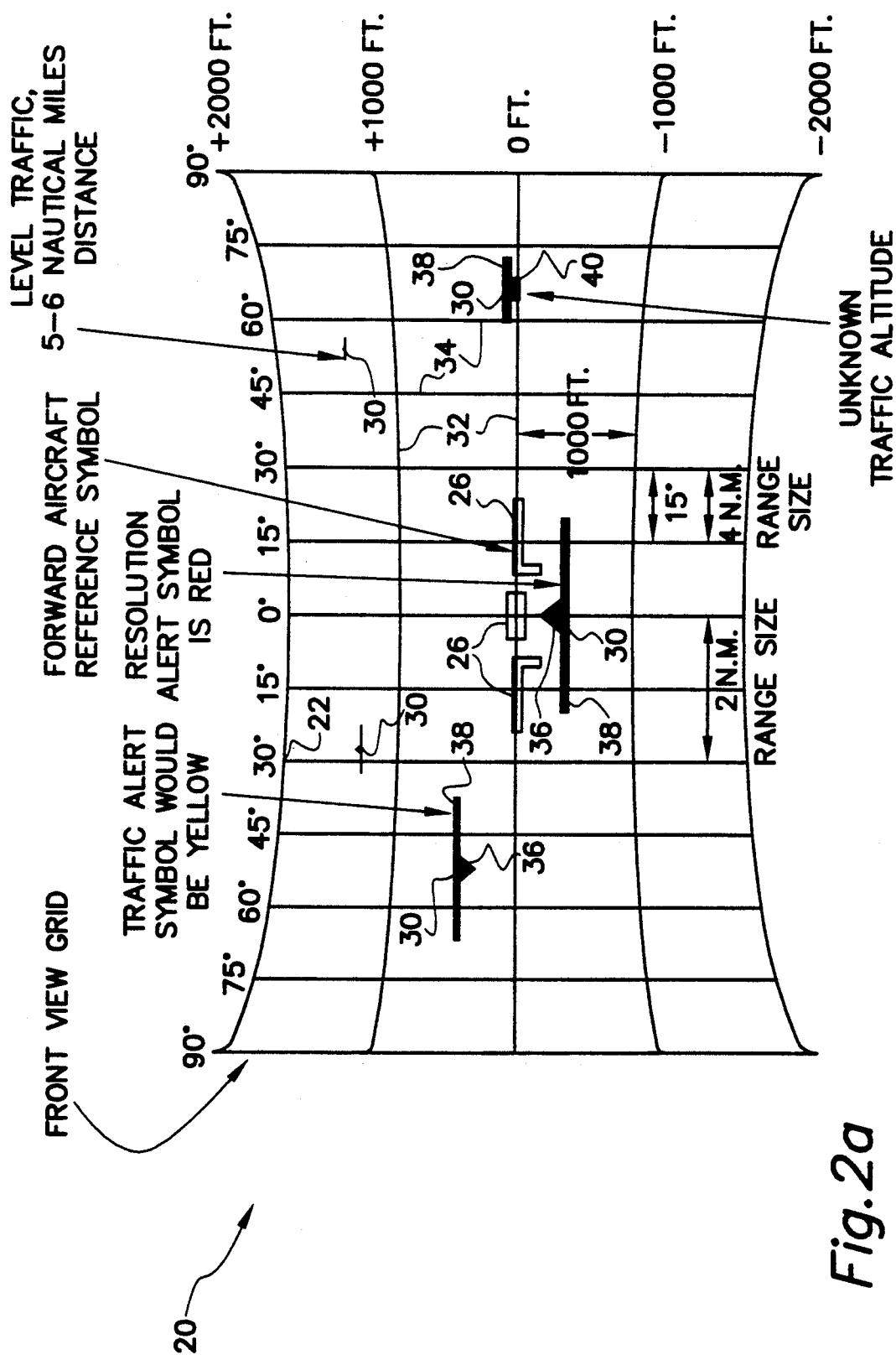
FIG. 2 shows a preferred embodiment of the present invention which is a three-dimensional perspective inside/out format for TCAS.

The proposed invention solves (or greatly minimizes) the problem of TCAS information portrayal by employing a three-dimensional perspective display format that emulates the spatial configuration of air traffic in a natural, egocentric three-dimensional airspace. The format presents a realistic view of the outside world from the pilot's point of view with appropriate depth cues to achieve the desired three-dimensional perspective. This perspective is referred to as an "inside/out" or "out-the-window" view. The inside/out view format has the advantage of direct mapping the three-dimensional air traffic information to the display in such a way that all of the necessary perceptual cues are integrated into a single pictorial format. The display is divided into two halves, one representing the forward view and the other the rear view. This is analogous to driving an automobile by naturally viewing forward through the windshield while monitoring the traffic behind using a rearview mirror. The format enables pilots to quickly interpret the overall traffic situation surrounding their own aircraft without going through complex cognitive processing.

Any number of methods may be employed to map three-dimensional air traffic positions to a two-dimensional plan view. The use of two-dimensional graphics, supplemented with an abstract code for the third dimension (e.g., numerical data tags for altitude coding), is one method. This method of information portrayal serves as foundation for existing TCAS displays. FIG. 1 illustrates the TCAS display format 10 developed in the related art which has served as the basic information display for existing TCAS systems. As can be seen from FIG. 1, graphical features are used to convey information about other aircraft in azimuth, range, direction of altitude change, and time before the closest point of approach. A ring of 12 asterisks 12 is positioned at a range of two nautical miles to provide information on azimuth and range in reference to own aircraft 14 position. Upward and downward arrows 16 are employed to depict the absolute direction of altitude change of displayed air traffic. Redundant color and shape coding are implemented to indicate the status of other aircraft in terms of time before the closest point of approach.

The most noticeable deficiency in the related art display format 10 is the use of numeric codes 18 to convey relative altitude. In order to determine the relative three-dimensional positions of displayed air traffic, a pilot cannot use simple pictorial cues but must take the time to read the numerical altitude data tags 18 associated with each traffic symbol and mentally integrate these data with the graphically presented azimuth and range information. This reading time can delay the pilot's decision about the position of an aircraft that poses an immediate threat. Such delays can become critical under high pilot workload situations such as flying in turbulence. The use of numerics 18 becomes increasingly cumbersome for interpreting the egocentric air traffic situation as the number of aircraft within the protected airspace increases.

Figure 2B:
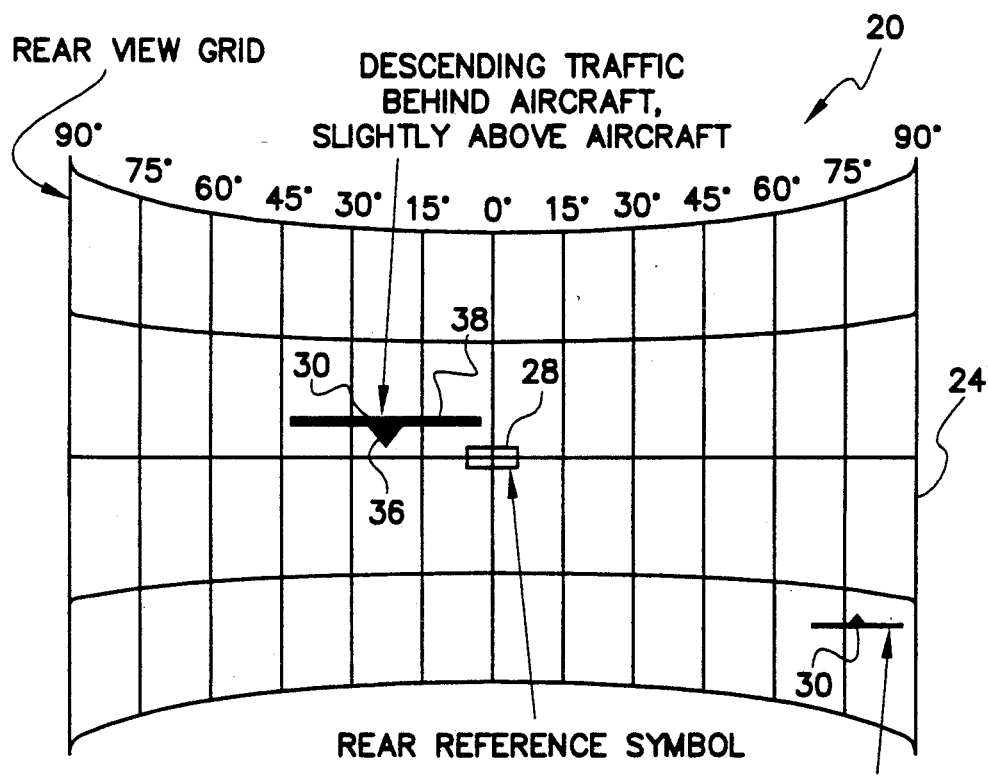

FIG. 2 depicts embodiment 20 of the present invention which is an inside/out three-dimensional perspective TCAS format. The resolution advisory is integrated with the traffic display on which information is portrayed in a three-dimensional perspective format. The display presents an "out-the-window" forward view 22 and a "rear view mirror" image 24 of the air space behind the pilot. The traffic is mapped onto a pair of cylindrical grids 22 and 24 where grid 22 is used for the forward view and smaller grid 24 maps the traffic behind the aircraft. The forward view 22 includes aircraft reference symbol 26 to indicate the pilot's own heading and altitude. The rear view 24 includes a simplified aircraft reference symbol 28 representing direction and altitude directly behind the pilot's own aircraft. The position of traffic symbol 30 relative to reference aircraft symbol 26 or 28 is used to represent the azimuth and elevation data. The size of traffic symbol 30 indicates the range of the target. The grid spacing is used for reference in determining all three parameters. Each horizontal grid line 32 represents a constant altitude differential (for instance, the middle line is 0 feet and the first line above middle could be +1000 feet). Vertical grid lines 34 indicate azimuth difference relative to the pilot's own heading (center line=0 degrees, first line to right is +15 degrees relative to your own aircraft heading). The altitude and azimuth reading are taken from the center position of traffic symbol 30. The range to the target is represented by the size of the symbol. For example, a symbol which is two grid 34 spacing in width would be 2 nautical miles away, while a symbol only one grid 34 spacing wide would be 4 nautical miles distant. The use of location and size gives the pilot not only excellent absolute parametric values but also relative motion cues. The shape of traffic symbol 30 is also used to indicate vertical tendency. Symbol 30 with a triangle 36 above or below wing symbol 38 is ascending or descending. Rectangle 40 above wings 38 indicates a constant altitude, and rectangle 40 below wings 38 is used to specify a traffic entity with unknown altitude. Of course, other shapes can be used to indicate such parameters as type of aircraft, aircraft motion (in addition to altitude), and to indicate priority of threat.

Color coding is also incorporated in the symbol to indicate the status of the other aircraft. Range, radar lock on (military), closing rate, or time to impact can be conveyed with appropriate color selection to indicate the level of threat. Red indicates a resolution alert. Yellow indicates a traffic alert. With this perspective display, pilots can simply use the integrated perceptual cues from a quick glance to understand the dynamic traffic situation in the three-dimensional airspace without the necessity of direct visual contact. They can do advanced planning without going through complex and difficult cognitive processing. Consequently, pilots may rely on the traffic display when direct visual contact is limited in bad weather and flight by instrument is necessary.

The mapping used in display 20 is not true three-dimensional perspective view. The difference is that all traffic is mapped onto cylindrical grids 22 and 24 at the appropriate elevation and azimuth location and then scaled in size to reflect distance. Note also that each grid, 22 and 24, is not a true perspective view in that vertical lines 34 are all equally spaced. This is done so that targets to the side are the same size as forward traffic symbols for a given range. This simplified perspective view has a big advantage in that much less processing capability is required than for true three-dimensional perspective view formats. This mapping technique is an important component of the invention. The net result is an easy to calculate display format which provides the pilot with excellent situational awareness.

Figure 3:
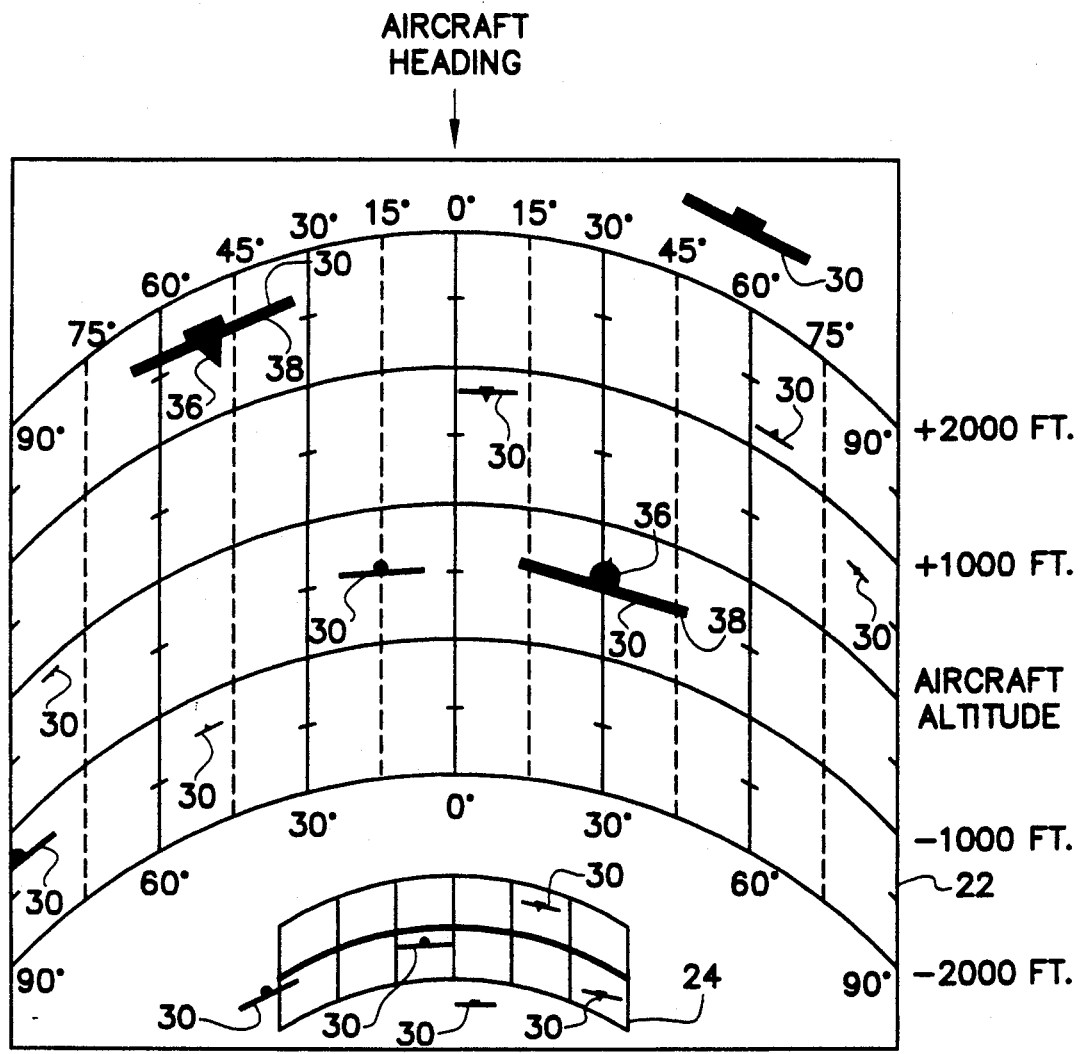
FIG. 3 reveals another version of the present embodiment of the invention.
Figure 4:
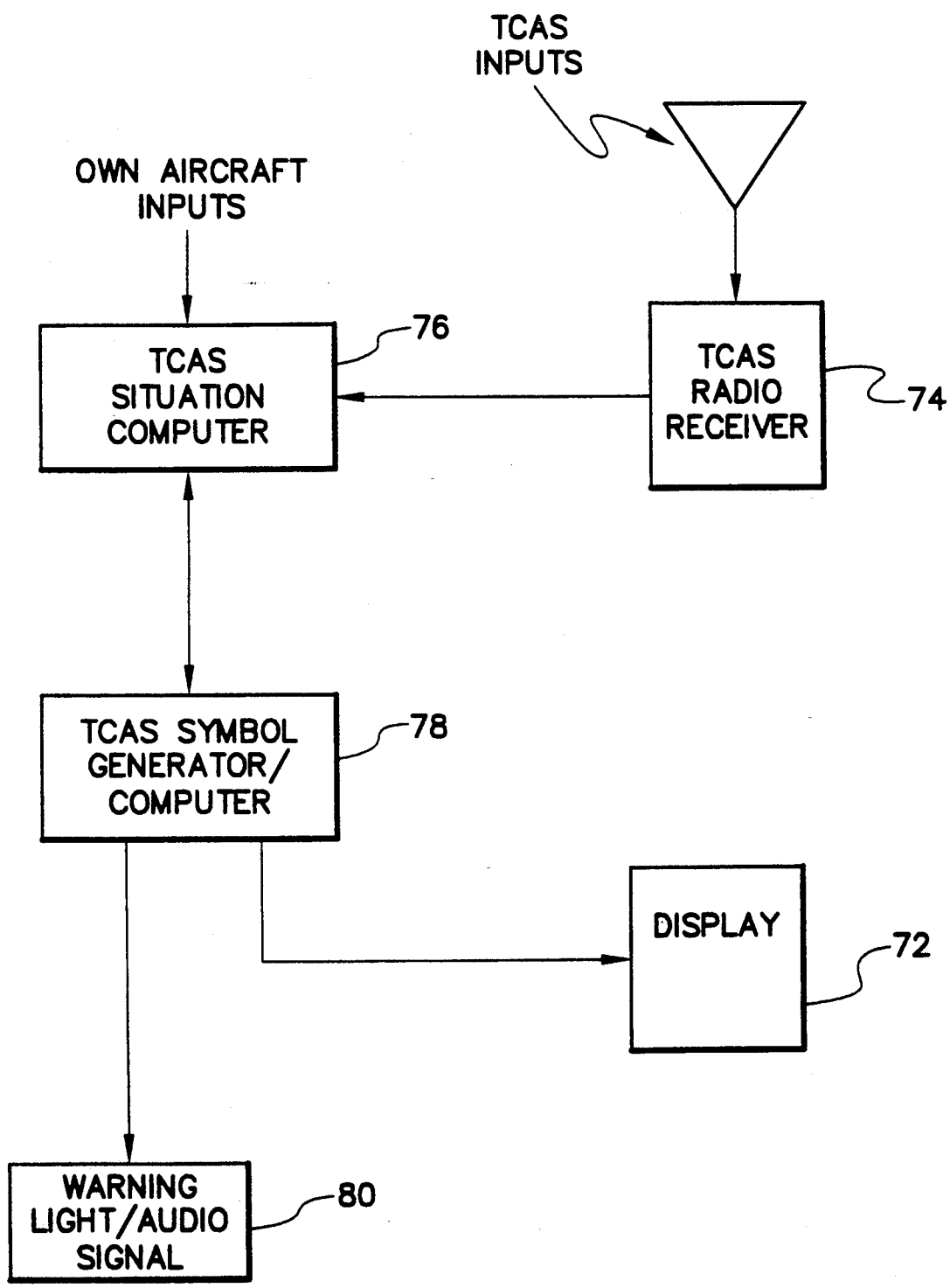
FIG. 4 is a general block diagram of the system utilized for generating formats of the invention.
Figure 5:
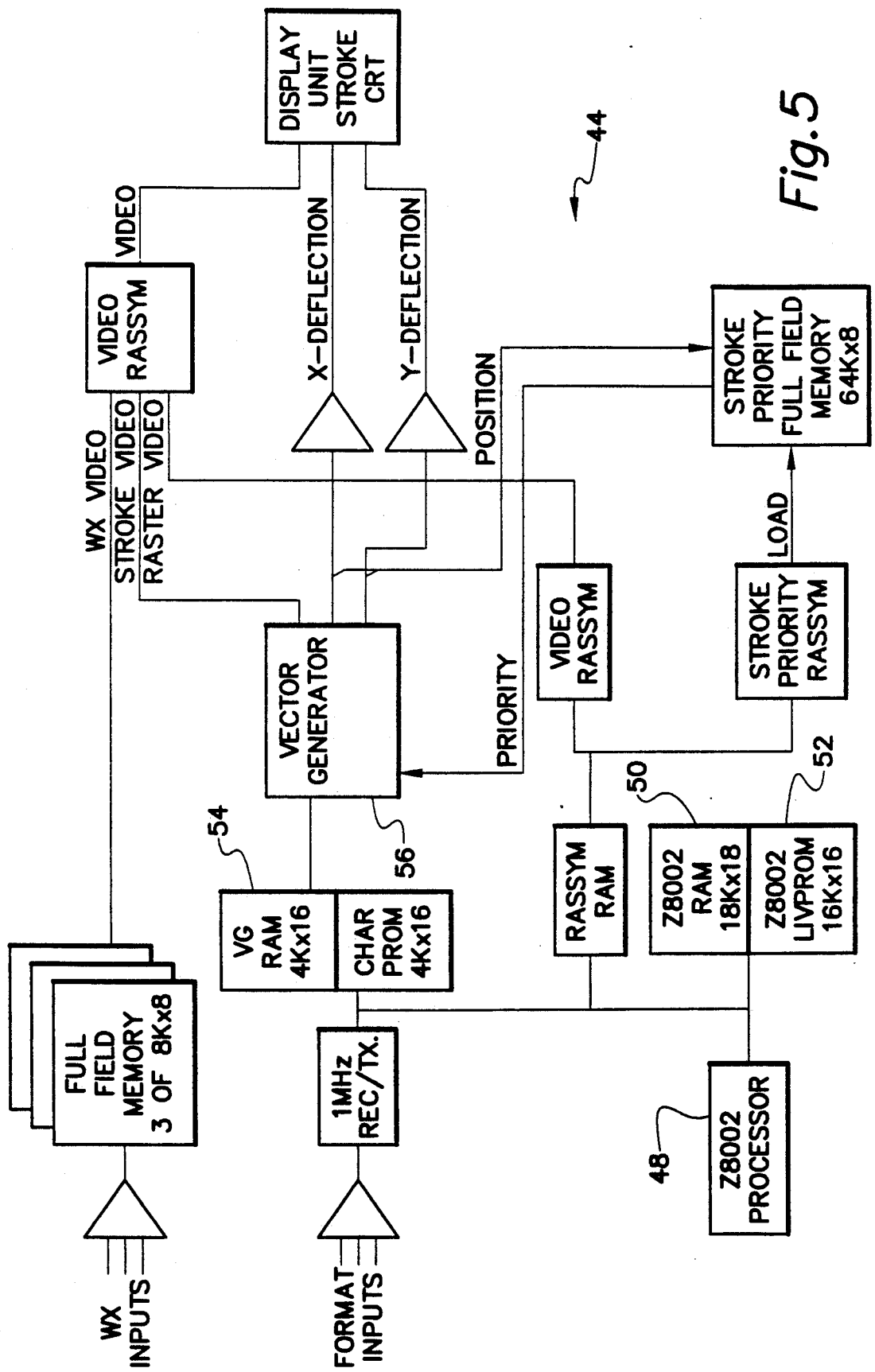
FIG. 5 shows architecture for formats on stroke displays.
Figure 6:
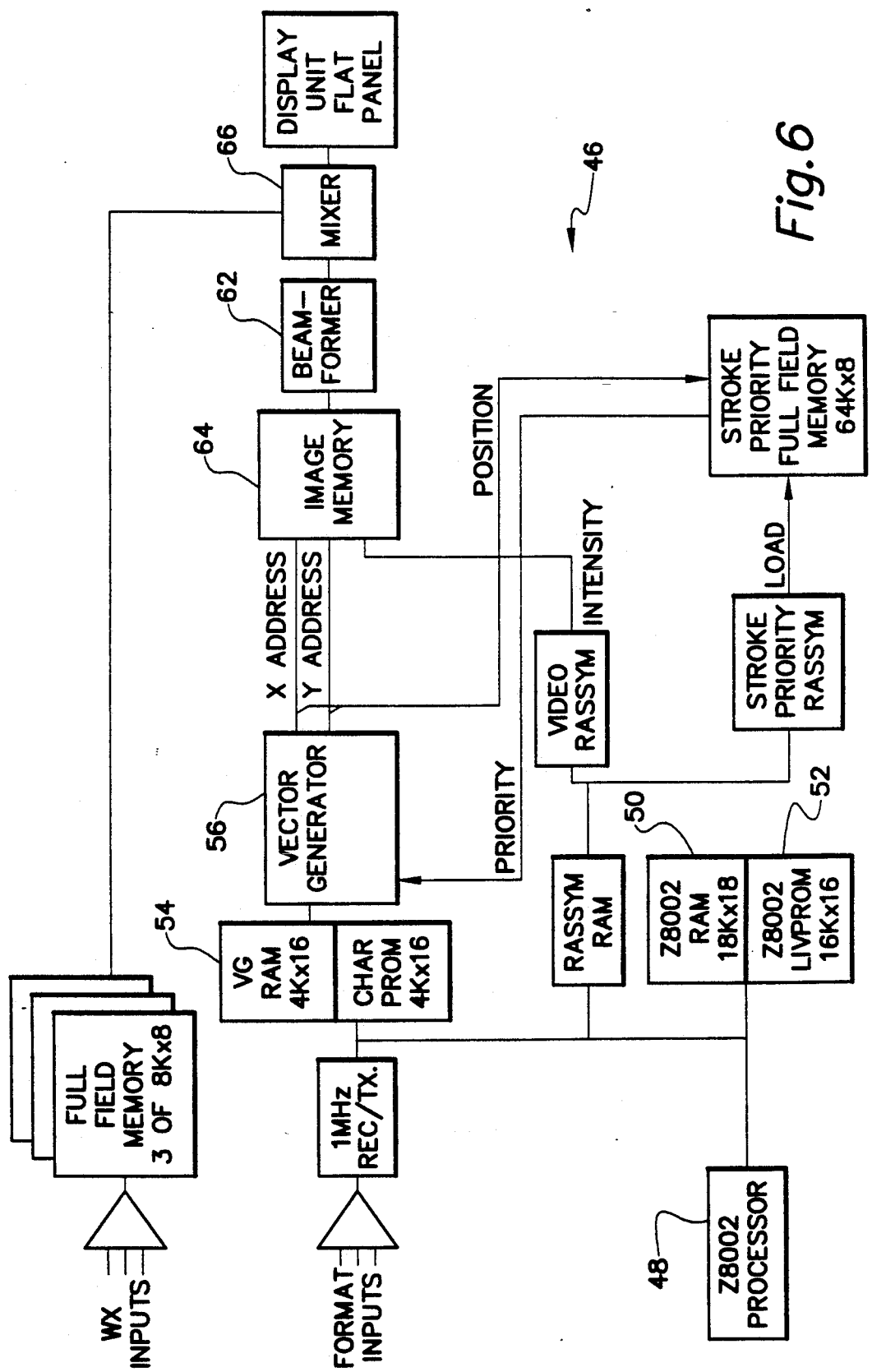
FIGS. 6 and 7 show architecture for formats on flat panel displays.
Figure 7:
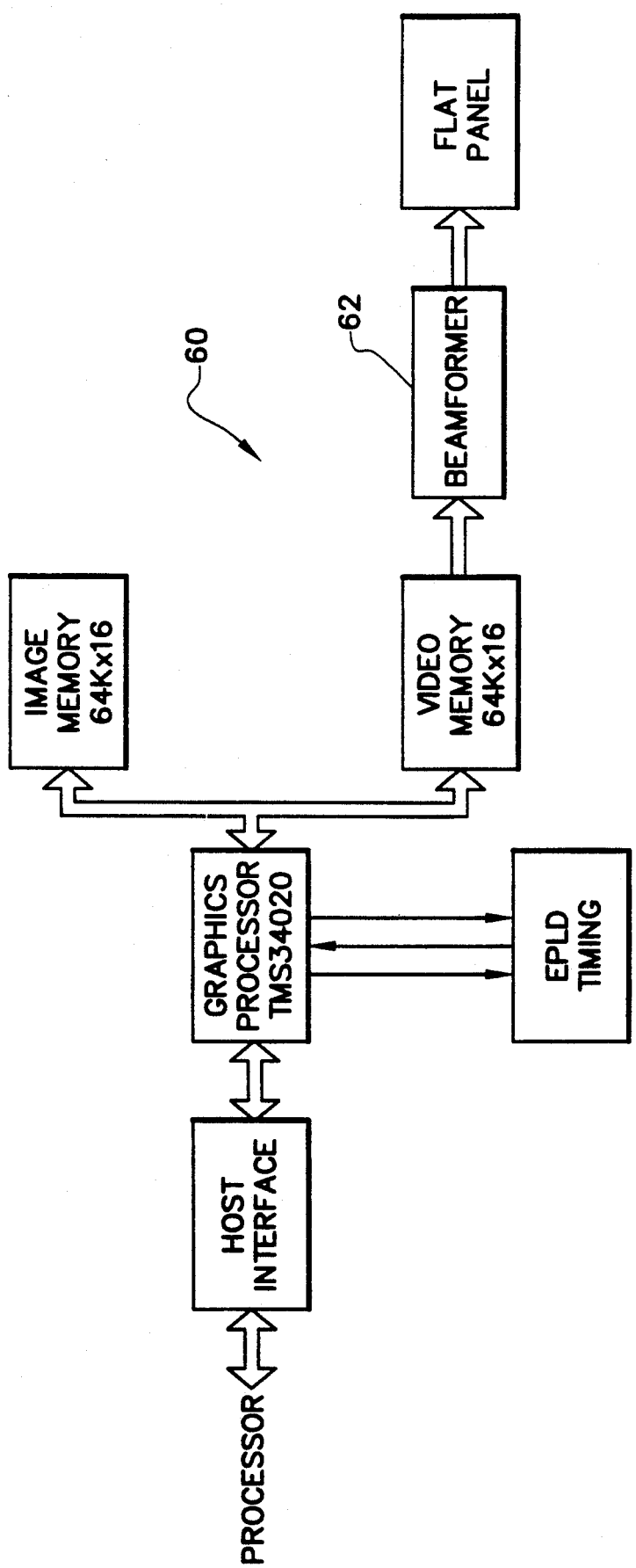
Figure 8:
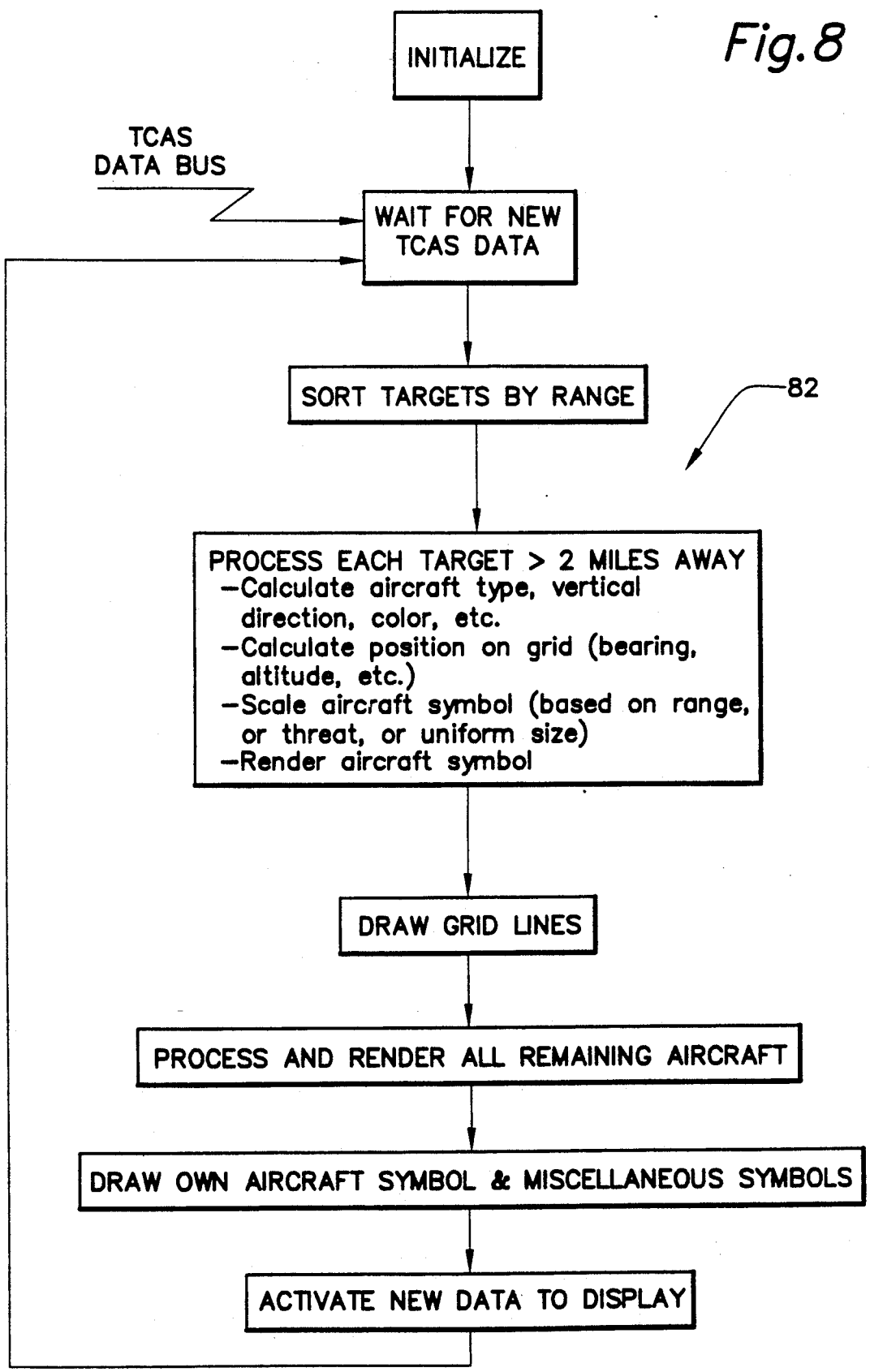
FIG. 8 is a system flow diagram for format generation.

The embodiment of the inside/out perspective display format 20 described in this disclosure can be implemented as a stand-alone display 40 in the same manner as display 20, having a different cylindrical grid perspective as in FIG. 3, or incorporated within other electronic avionics displays such as a vertical speed indicator, electronic attitude director indicator (EADI), electronic horizontal situation indicator (EHSI), or radar display. Variations in symbology such as color and shape coding is like that of format 20. Such variations may be used to indicate a particular status, including whether the traffic is approaching towards or receding from the pilot's craft, or describe the identification characteristics of the traffic entity being symbolized. As the aviation industry extends the resolution advisory function of TCAS to include both vertical and horizontal maneuvers, a three-dimensional perspective format will allow pilots to comprehend the dynamic traffic situation quickly and to verify suggested maneuvers easily.

```
/*********************************************************************************
 *                                                                               *
 *   COMMON_TCAS:  THIS FILE CONTAINS THE PROCEDURES COMMON TO BOTH PERSPECTIVE AND *
 *                 BASELINE TCAS FORMATS.                                         *
 *                                                                               *
 *                                                                               *
 *                                                                               *
 *                                                                               *
 *********************************************************************************/

*systype "sys5"
#include <stdio.h>
#include <math.h>
#include "/sys/ins/base.ins.c";
#include "/sys/ins/error.ins.c";
#include "/sys/ins/pgm.ins.c";
#include "/sys/ins/gmr3d.ins.c";
#include "/sys/ins/kbd.ins.c"
#include "/sys/ins/time.ins.c"
#include "/sys/ins/cal.ins.c";

#define     PI              3.1415927
#define     red             8
#define     yellow          9
#define     cyan            10
#define     magenta         11
#define     white           12
#define     crash_margin    0.2
#define     max_traffic     7
#define     dual_window     0
#define     oval_define     0
status_$t               st;              /* returns status of 3DGMR routines */
gmr_$file_id_t          file_id;         /* file id for GMR file             */
gmr_$i2_point_t         bitmap_size    = {1280,1024};
                                         /* bitmap size                      */
short                   plane_cnt    = 8; /* number of color planes in system */
short                   oval = oval_define; /* selects oval or round baseline view */
gmr_$viewport_id_t      vpid;            /* viewport id number               */
#if dual_window
#if oval_define
gmr_$f3_limits_t        obj_vp_ldc    = { -0.3, 1.3, -0.216, 0.756, 0.0, 1.0 };
#else
gmr_$f3_limits_t        obj_vp_ldc    = { .014, 0.986, -0.216, 0.756, 0.0, 1.0 };
#endif
gmr_$viewport_id_t      vpid_2;                   /* viewport id number       */
gmr_$f3_limits_t        obj_vp_ldc_2  = {- 0.15, 1.15, 0.5, 1.03, 0.0, 1.0 };
short                   declutter   = 1;    /* decluttering function: range 0-3 */
#else
gmr_$f3_limits_t        obj_vp_ldc    = { 0.0, 1.0, 0.0, 1.0, 0.0, 1.0 };
short                   declutter   = 3;    /* decluttering function: range 0-3 */
endif gmr_$structure_id_t     scene1_id;       /* the 1st composite structure id  */
gmr_$structure_id_t     scene2_id;       /* the 2nd composite structure id  */ typedef enum    { xy, xz, yz } planes_t;
planes_t                plane;           /* the 3 planes symbols can lie in */
typedef enum    { prox, ta, ra } threat_level_t;
typedef enum    { up, down, none } v_direction_t;
typedef struct {
    boolean             active;          /* active status flag              */
    boolean             contender;       /* denotes possible threat         */
    threat_level_t      threat_level;    /* threat of traffic - prox, ta, ra */
    gmr_$f3_vector_t    position;        /* 3d location of traffic symbol   */
    v_direction_t       v_direction;     /* vertical direction indicator    */
    boolean             alt_known;       /* valid altitude data indicator   */
    float               az_dist;         /* azimuth distance from my plane  */
    float               vx;              /* constant x velocity of symbol   */
    float               vy;              /* constant y velocity of symbol   */
```

```
    float               vz;                 /* constant z velocity of symbol   */
    float               lambda;             /* time to closest approach        */
    float               r_closest;          /* point of closest approach       */
    } traffic_t;
traffic_t               traffic[ max_traffic ]; /* traffic array of structures */ gmr_$buffer_mode_t      buffer_mode    = gmr_$double_buffer;
gmr_$buffer_t           buffer1        = gmr_$1st_buffer;
gmr_$buffer_t           buffer2        = gmr_$2nd_buffer;
gmr_$buffer_t           inq_buffer;
char                    postfile[ 80 ];

/************************************************************
*                                                           *
*       CHECK                                               *
*                                                           *
*       PROCEDURE: CHECK STATUS AND PRINT ERROR.            *
*                                                           *
************************************************************/
void    check()
{
    if (st.all != status_$ok)
        error_$print(st);
}

/************************************************************

DM_REFRESH: PROC CALLED BY DM TO REFRESH DISPLAY

************************************************************/
dm_refresh( unobscured, pos_change, old_dev_limits, old_max_device )
boolean                         unobscured, pos_change;
gmr_$f3_limits_t                old_dev_limits, old_max_device;
{
    gmr_$display_refresh( st ); check( st );
}

/************************************************************
*                                                           *
*       POW                                                 *
*                                                           *
*       PROCEDURE: RAISE X TO POWER OF N                    *
*                                                           *
************************************************************/
float pow( x, n )
float   x;
int     n;
{
short   i;
float   result;

result = x;
    for (i=1; i<n; i++) result *= x;
    return(result);

}

/********************************************************************************
*                                                                               *
*       AZIMUTH_DISTANCE                                                        *
*                                                                               *
*       PROCEDURE:  CALCULATES THE LENGTH OF THE AZIMUTH VECTOR FROM OWN AIRCRAFT *
*                   TO THE GIVEN TRAFFIC SYMBOL POSITION.                       *
*                                                                               *
*       PARAMS:     POSITION => POSITION OF TRAFFIC SYMBOL IN REAL WORLD COORDS. *
*                                                                               *
********************************************************************************/
float   azimuth_distance( position )
gmr_$f3_vector_t        position;
{
float   result, temp;

temp = pow( position.x, 2 ) + pow( position.y, 2 );
```

```
    result = sqrt( temp );
    return( result );
}

/****************************************************************************
 *                                                                          *
 *      INIT_TRAFFIC                                                        *
 *                                                                          *
 *      PROCEDURE: INITIALIZES THE STRUCTURE DATA IN THE TRAFFIC ARRAY.     *
 *                                                                          *
 ****************************************************************************/ traffic()

traffic[ (short)0 ].active          = true;
    traffic[ (short)0 ].contender       = true;
    traffic[ (short)0 ].threat_level    = prox;
    traffic[ (short)0 ].position.x      = -0.9;
    traffic[ (short)0 ].position.y      = -0.2;
    traffic[ (short)0 ].position.z      =  0.4;
    traffic[ (short)0 ].v_direction     = down;
    traffic[ (short)0 ].alt_known       = true;
    traffic[ (short)0 ].az_dist         = azimuth_distance( traffic[ (short)0 ].position );
    traffic[ (short)0 ].vx              = -0.01;
    traffic[ (short)0 ].vy              =  0.0022;
    traffic[ (short)0 ].vz              = -0.0044;
    traffic[ (short)0 ].lambda          =  0.00;
    traffic[ (short)0 ].r_closest       =  0.00;

traffic[ (short)1 ].active          = true;
    traffic[ (short)1 ].contender       = true;
    traffic[ (short)1 ].threat_level    = prox;
    traffic[ (short)1 ].position.x      = -0.7;
    traffic[ (short)1 ].position.y      =  0.5;
    traffic[ (short)1 ].position.z      =  0.6;
    traffic[ (short)1 ].v_direction     = down;
    traffic[ (short)1 ].alt_known       = true;
    traffic[ (short)1 ].az_dist         = azimuth_distance( traffic[ (short)1 ].position );
    traffic[ (short)1 ].vx              =  0.02;
    traffic[ (short)1 ].vy              = -0.01;
    traffic[ (short)1 ].vz              = -0.009;
    traffic[ (short)1 ].lambda          =  0.00;
    traffic[ (short)1 ].r_closest       =  0.00;

traffic[ (short)2 ].active          = true;
    traffic[ (short)2 ].contender       = true;
    traffic[ (short)2 ].threat_level    = prox;
    traffic[ (short)2 ].position.x      = -0.4;
    traffic[ (short)2 ].position.y      =  0.8;
    traffic[ (short)2 ].position.z      = -0.3;
    traffic[ (short)2 ].v_direction     = up;
    traffic[ (short)2 ].alt_known       = true;
    traffic[ (short)2 ].az_dist         = azimuth_distance( traffic[ (short)2 ].position );
    traffic[ (short)2 ].vx              =  0.026;
    traffic[ (short)2 ].vy              = -0.022;
    traffic[ (short)2 ].vz              =  0.012;
    traffic[ (short)2 ].lambda          =  0.00;
    traffic[ (short)2 ].r_closest       =  0.00;

traffic[ (short)3 ].active          = true;
    traffic[ (short)3 ].contender       = true;
    traffic[ (short)3 ].threat_level    = prox;
    traffic[ (short)3 ].position.x      =  0.3;
    traffic[ (short)3 ].position.y      =  0.95;
    traffic[ (short)3 ].position.z      = -0.1;
    traffic[ (short)3 ].v_direction     = up;
    traffic[ (short)3 ].alt_known       = true;
    traffic[ (short)3 ].az_dist         = azimuth_distance( traffic[ (short)3 ].position );
    traffic[ (short)3 ].vx              =  0.0002;
    traffic[ (short)3 ].vy              = -0.017;
    traffic[ (short)3 ].vz              =  0.004;
    traffic[ (short)3 ].lambda          =  0.00;
    traffic[ (short)3 ].r_closest       =  0.00;

traffic[ (short)4 ].active          = true;
    traffic[ (short)4 ].contender       = true;
    traffic[ (short)4 ].threat_level    = prox;
    traffic[ (short)4 ].position.x      =  0.95;
    traffic[ (short)4 ].position.y      =  0.1;
    traffic[ (short)4 ].position.z      =  0.19;
    traffic[ (short)4 ].v_direction     = down;
    traffic[ (short)4 ].alt_known       = true;
```

```
    traffic[ (short)4 ].az_dist           = azimuth_distance( traffic[ (short)4 ].position );
    traffic[ (short)4 ].vx                = -0.016;
    traffic[ (short)4 ].vy                = -0.001;
    traffic[ (short)4 ].vz                = -0.0038;
    traffic[ (short)4 ].lambda            = 0.00;
    traffic[ (short)4 ].r_closest         = 0.00;

traffic[ (short)5 ].active            = true;
    traffic[ (short)5 ].contender         = true;
    traffic[ (short)5 ].threat_level      = prox;
    traffic[ (short)5 ].position.x        = 0.3;
    traffic[ (short)5 ].position.y        = -0.9;
    traffic[ (short)5 ].position.z        = -0.25;
    traffic[ (short)5 ].v_direction       = up;
    traffic[ (short)5 ].alt_known         = false;
    traffic[ (short)5 ].az_dist           = azimuth_distance( traffic[ (short)5 ].position );
    traffic[ (short)5 ].vx                = -0.01;
    traffic[ (short)5 ].vy                = 0.004;
    traffic[ (short)5 ].vz                = 0.0033;
    traffic[ (short)5 ].lambda            = 0.00;
    traffic[ (short)5 ].r_closest         = 0.00;

traffic[ (short)6 ].active            = true;
    traffic[ (short)6 ].contender         = true;
    traffic[ (short)6 ].threat_level      = prox;
    traffic[ (short)6 ].position.x        = -0.05;
    traffic[ (short)6 ].position.y        = -0.95;
    traffic[ (short)6 ].position.z        = 0.2;
    traffic[ (short)6 ].v_direction       = none;
    traffic[ (short)6 ].alt_known         = true;
    traffic[ (short)6 ].az_dist           = azimuth_distance( traffic[ (short)6 ].position );
    traffic[ (short)6 ].vx                = -0.00045;
    traffic[ (short)6 ].vy                = 0.017;
    traffic[ (short)6 ].vz                = 0.00;
    traffic[ (short)6 ].lambda            = 0.00;
    traffic[ (short)6 ].r_closest         = 0.00;
}

/******************************************************************************
*                                                                             *
*       SET_COLOR                                                             *
*                                                                             *
*       PROCEDURE: SETS UP THE COLOR MAP WITH TEN SHADES EACH OF RED, YELLOW, CYAN, *
*                 AND WHITE. THIS PROCEDURE USES THE HUE, SATURATION, AND VALUE    *
*                 SCHEME FOR GENERATING THE DESIRED COLORS.                   *
*                                                                             *
******************************************************************************/
void    set_color()
{
static  gmr_$hsv_color_t     low_red       = { 0.0, 1.0, 0.3 };
static  gmr_$hsv_color_t     high_red      = { 0.0, 1.0, 1.0 };
static  gmr_$hsv_color_t     low_yellow    = { 0.1667, 1.0, 0.3 };
static  gmr_$hsv_color_t     high_yellow   = { 0.1667, 1.0, 1.0 };
static  gmr_$hsv_color_t     low_cyan      = { 0.5, 1.0, 0.3 };
static  gmr_$hsv_color_t     high_cyan     = { 0.5, 1.0, 1.0 };
static  gmr_$hsv_color_t     low_magenta   = { 0.8333, 1.0, 0.3 };
static  gmr_$hsv_color_t     high_magenta  = { 0.8333, 1.0, 1.0 };
static  gmr_$hsv_color_t     low_white     = { 0.0, 0.0, 0.0 };
static  gmr_$hsv_color_t     high_white    = { 0.0, 0.0, 1.0 };

gmr_$color_set_range( red, (short)81, (short)10, st ); check( st );
    gmr_$color_define_hsv( red, low_red, high_red, st ); check( st );
    gmr_$color_set_range( yellow, (short)91, (short)10, st ); check( st );
    gmr_$color_define_hsv( yellow, low_yellow, high_yellow, st ); check( st );
    gmr_$color_set_range( cyan, (short)101, (short)10, st ); check( st );
    gmr_$color_define_hsv( cyan, low_cyan, high_cyan, st ); check( st );
    gmr_$color_set_range( magenta, (short)111, (short)10, st ); check( st );
    gmr_$color_define_hsv( magenta, low_magenta, high_magenta, st ); check( st );
    gmr_$color_set_range( white, (short)121, (short)10, st ); check( st );
    gmr_$color_define_hsv( white, low_white, high_white, st ); check( st );
}

/******************************************************************************
*                                                                             *
*       POLYGON                                                               *
*                                                                             *
*       PROCEDURE: GENERATES A POLYGON OF A SPECIFIED NUMBER OF LINE SEGMENTS BY  *
*                 TRAVELING AROUND THE UNIT CIRCLE. THE MORE LINE SEGMENTS THE    *
*                 CLOSER YOU GET TO A CIRCLE. THE POLYGON LIES IN THE SPECIFIED   *
*                 PLANE, I.E. XY, XZ, OR YZ AND IS SCALED BY THE SPECIFIED SCALING *
*                 VECTOR. A STARTING POINT OFFSET IS ALSO ACCEPTED.           *
*                                                                             *
```

```
*       PARAMS:     DETAIL => NUMBER OF LINE SEGMENTS TO GENERATE THE POLYGON.       *
*                   PLANE  => WHICH PLANE TO BUILD THE POLYGON IN=> XY, XZ, YZ.      *
*                   SCALE  => 3D SCALING VECTOR.                                     *
*                   START_POINT => STARTING POINT ON THE UNIT CIRCLE.                *
*                                                                                    *
**************************************************************************************/
void    polygon( detail, plane, scale, start_point )
#define             n_max   1024
    it              detail;
    res_t           plane;
    $f3_vector_t    scale;
    it              start_point;

it                      i, n;
    $f3_point_array_t       p;
    at                      theta, d_theta;

if (( detail > n_max ) || ( detail < 3 ))
        n = n_max;
    else
        n = detail;
    d_theta = (float)( 2.0 * PI / n );

switch( plane )
    {
        case xy:    for ( i = 0; i < n; i++ )
                    {
                        theta = (float)(i * d_theta + start_point);
                        p[ i ].x = cos( theta ) * scale.x;
                        p[ i ].y = sin( theta ) * scale.y;
                        p[ i ].z = 0.0;
                    }
                    break;
        case xz:    for ( i = 0; i < n; i++ )
                    {
                        theta = (float)(i * d_theta + start_point);
                        p[ i ].x = cos( theta ) * scale.x;
                        p[ i ].z = sin( theta ) * scale.z;
                        p[ i ].y = 0.0;
                    }
                    break;
        case yz:    for ( i = 0; i < n; i++ )
                    {
                        theta = (float)(i * d_theta + start_point);
                        p[ i ].y = cos( theta ) * scale.y;
                        p[ i ].z = sin( theta ) * scale.z;
                        p[ i ].x = 0.0;
                    }
                    break;
    }
    p[ n ] = p[ 0 ];
    gmr_$f3_polygon( (short)(n+1), p, st ); check( st );
}

/**************************************************************************************
*                                                                                    *
*       STICK_PLANE                                                                  *
*                                                                                    *
*       PROCEDURE: GENERATES A STICK PLANE TO REPRESENT MY AIRCRAFT                  *
*                                                                                    *
*       PARAMS:    SCALE => 3D SCALING VECTOR FOR STICK PLANE                        *
*                                                                                    *
**************************************************************************************/
void    stick_plane( scale )
gmr_$f3_vector_t    scale;
{
gmr_$f3_point_array_t   p;

p[ 0 ].x =  -0.6   * scale.x;
    p[ 0 ].y =   0.0   * scale.y;
    p[ 0 ].z =   0.0   * scale.z;
    p[ 1 ].x =   1.2   * scale.x;
    p[ 1 ].y =   0.0   * scale.y;
    p[ 1 ].z =   0.0   * scale.z;
    p[ 2 ].x =   0.0   * scale.x;
    p[ 2 ].y =   0.85  * scale.y;
    p[ 2 ].z =   0.0   * scale.z;
    p[ 3 ].x =   0.0   * scale.x;
    p[ 3 ].y =  -0.85  * scale.y;
    p[ 3 ].z =   0.0   * scale.z;
    p[ 4 ].x =   1.0   * scale.x;
    p[ 4 ].y =   0.31  * scale.y;
```

```c
        p[ 4 ].z =  0.0   * scale.z;
        p[ 5 ].x =  1.0   * scale.x;
        p[ 5 ].y = -0.31  * scale.y;
        p[ 5 ].z =  0.0   * scale.z;
    gmr_$f3_multiline( (short)6, p, st ); check( st );
}

/****************************************************************************************
 *                                                                                       *
 *      CHEVRON                                                                          *
 *                                                                                       *
 *      PROCEDURE: GENERATES A CHEVRON SYMBOL TO REPRESENT MY AIRCRAFT                   *
 *                                                                                       *
 *      PARAMS:    SCALE => 3D SCALING VECTOR FOR CHEVRON                                *
 *                                                                                       *
 ****************************************************************************************/
void    chevron( scale )
gmr_$f3_vector_t    scale;
{
gmr_$f3_point_array_t   p;

p[ 0 ].x =  0.0   * scale.x;
    p[ 0 ].y =  0.0   * scale.y;
    p[ 0 ].z =  0.0   * scale.z;
    p[ 1 ].x =  0.707 * scale.x;
    p[ 1 ].y =  0.707 * scale.y;
    p[ 1 ].z =  0.0   * scale.z;
    p[ 2 ].x = -1.0   * scale.x;
    p[ 2 ].y =  0.0   * scale.y;
    p[ 2 ].z =  0.0   * scale.z;
    p[ 3 ].x =  0.707 * scale.x;
    p[ 3 ].y = -0.707 * scale.y;
    p[ 3 ].z =  0.0   * scale.z;
    p[ 4 ].x =  0.0   * scale.x;
    p[ 4 ].y =  0.0   * scale.y;
    p[ 4 ].z =  0.0   * scale.z;
    gmr_$f3_polygon( (short)5, p, st ); check( st );
}

/****************************************************************************************
 *                                                                                       *
 *      CALC_THREAT                                                                      *
 *                                                                                       *
 *      PROCEDURE: CALCULATES THE LEVEL OF THREAT FOR ALL TRAFFIC SYMBOLS.               *
 *                 IF A TRAFFIC SYMBOL WILL INVADE THE CRASH_MARGIN VOLUME WITHIN        *
 *                 45 SECONDS HE IS CONSIDERED A "TRAFFIC ADVISORY (TA)", WITHIN         *
 *                 30 SECONDS HE IS CONSIDERED A "RESOLUTION ADVISORY (RA)".  ALL        *
 *                 OTHER TRAFFIC ARE CONSIDERED "PROXIMITY TRAFFIC (PROX)".              *
 *                                                                                       *
 *      PARAMS:    INDEX => INDEX INTO THE TRAFFIC STRUCTURE ARRAY.                      *
 *                                                                                       *
 ****************************************************************************************/
void    calc_threat()
{
short   index;

for ( index = 0; index < max_traffic; index++ )
    {
        if ( traffic[ index ].contender )
            if ( traffic[ index ].vx + traffic[ index ].vy + traffic[ index ].vz )
            {
                traffic[ index ].lambda = ( -traffic[ index ].position.x * traffic[ index ].vx -
                                             traffic[ index ].position.y * traffic[ index ].vy -
                                             traffic[ index ].position.z * traffic[ index ].vz )/
                                         ( pow( traffic[ index ].vx, 2 ) +
                                           pow( traffic[ index ].vy, 2 ) +
                                           pow( traffic[ index ].vz, 2 ) );
                if ( traffic[ index ].lambda > 45 )
                    traffic[ index ].lambda = 45;
                traffic[ index ].r_closest = sqrt( ( pow( (traffic[ index ].position.x +
                                                           traffic[ index ].lambda *
                                                           traffic[ index ].vx), 2 ) +
                                                     pow( (traffic[ index ].position.y +
                                                           traffic[ index ].lambda *
                                                           traffic[ index ].vy), 2 ) +
                                                     pow( (traffic[ index ].position.z +
                                                           traffic[ index ].lambda *
                                                           traffic[ index ].vz), 2 ) ) );
                if ( traffic[ index ].lambda < -5.0 )
                {
                    traffic[ index ].threat_level = prox;
                    traffic[ index ].contender = false;
                }
                else
                {
```

```c
                if ( traffic[ index ].r_closest <= crash_margin )
                {
                    if ( traffic[ index ].lambda <= 30.0 )
                        traffic[ index ].threat_level = ra;
                    else
                        traffic[ index ].threat_level = ta;
                }
                else
                    traffic[ index ].threat_level = prox;
            }
        }
    }
```

```
/************************************************************************
*                                                                       *
*       UPDATE_TRAFFIC                                                  *
*                                                                       *
*       PROCEDURE:  UPDATES TRAFFIC POSITION BASED UPON TRAFFIC VELOCITY AND *
*                   ELAPSED_TIME.                                       *
*                                                                       *
*       PARAMS:     ELAPSED_TIME => TIME ELAPSED FROM LAST UPDATE_TRAFFIC CALL. *
*                                                                       *
************************************************************************/
void    update_traffic( elapsed_time )
float   elapsed_time;
{
short           index;

for ( index = 0; index < max_traffic; index++ )
    {
        traffic[ index ].position.x += traffic[ index ].vx * elapsed_time;
        traffic[ index ].position.y += traffic[ index ].vy * elapsed_time;
        traffic[ index ].position.z += traffic[ index ].vz * elapsed_time;
        traffic[ index ].az_dist = azimuth_distance( traffic[ index ].position );
        if ( (traffic[ index ].az_dist >= 1.1 ) ||
             (traffic[ index ].position.z > 0.9) ||
             (traffic[ index ].position.z < -0.5) )
        {
            traffic[ index ].contender = true;
            traffic[ index ].vx = -traffic[ index ].vx;
            traffic[ index ].vy = -traffic[ index ].vy;
            traffic[ index ].vz = -traffic[ index ].vz;
            if ( traffic[ index ].v_direction == up )
                traffic[ index ].v_direction = down;
            else
                if ( traffic[ index ].v_direction == down )
                    traffic[ index ].v_direction = up;
        }
    }
}
```

```
/************************************************************************
*                                                                       *
*       ANIMATE_SCENE                                                   *
*                                                                       *
*       PROCEDURE:  CYCLES BETWEEN TWO BUFFERS AND SCENE STRUCTURES DISPLAYING THE *
*                   THE TRAFFIC SYMBOLOGY WITH UPDATED TCAS DATA.  IN OTHER WORDS  *
*                   THE LITTLE PLANES MOVE AROUND.                      *
*                                                                       *
************************************************************************/
void    animate_scene()
{
#if dual_window
    gmr_$dbuff_inq_select_buffer( vpid, inq_buffer, st ); check( st );
    if ( inq_buffer == gmr_$1st_buffer )
    {
        gmr_$viewport_set_structure( vpid, scene1_id, st ); check( st );
        gmr_$viewport_refresh( vpid, st ); check( st );
        gmr_$viewport_set_structure( vpid_2, scene1_id, st ); check( st );
        gmr_$viewport_refresh( vpid_2, st ); check( st );
        gmr_$dbuff_set_display_buffer( gmr_$1st_buffer, vpid, st ); check( st );
        gmr_$dbuff_set_display_buffer( gmr_$1st_buffer, vpid_2, st ); check( st );
        gmr_$dbuff_set_select_buffer( gmr_$2nd_buffer, vpid, st ); check( st );
        gmr_$dbuff_set_select_buffer( gmr_$2nd_buffer, vpid_2, st ); check( st );
        gmr_$structure_open( scene2_id, false, st ); check( st );
    }
    else
    {
```

```
        gmr_$viewport_set_structure( vpid, scene2_id, st ); check( st );
        gmr_$viewport_refresh( vpid, st ); check( st );
        gmr_$viewport_set_structure( vpid_2, scene2_id, st ); check( st );
        gmr_$viewport_refresh( vpid_2, st ); check( st );
        gmr_$dbuff_set_display_buffer( gmr_$2nd_buffer, vpid, st ); check( st );
        gmr_$dbuff_set_display_buffer( gmr_$2nd_buffer, vpid_2, st ); check( st );
        gmr_$dbuff_set_select_buffer( gmr_$1st_buffer, vpid, st ); check( st );
        gmr_$dbuff_set_select_buffer( gmr_$1st_buffer, vpid_2, st ); check( st );
        gmr_$structure_open( scene1_id, false, st ); check( st );

gmr_$structure_erase( st ); check( st );
    create_scene_2();  /* inside/out scene */
    sort_traffic();    /* now do plan view scene */
    create_scene();
    gmr_$structure_close( true, st ); check( st );
#else
    gmr_$dbuff_inq_select_buffer( vpid, inq_buffer, st ); check( st );
    if ( inq_buffer == buffer1 )
    {
        gmr_$viewport_set_structure( vpid, scene1_id, st ); check( st );
        gmr_$viewport_refresh( vpid, st ); check( st );
        gmr_$dbuff_set_display_buffer( buffer1, vpid, st ); check( st );
        gmr_$dbuff_set_select_buffer( buffer2, vpid, st ); check( st );
        gmr_$structure_open( scene2_id, false, st ); check( st );
        gmr_$structure_erase( st ); check( st );
        create_scene();
        gmr_$structure_close( true, st ); check( st );
    }
    else
    {
        gmr_$viewport_set_structure( vpid, scene2_id, st ); check( st );
        gmr_$viewport_refresh( vpid, st ); check( st );
        gmr_$dbuff_set_display_buffer( buffer2, vpid, st ); check( st );
        gmr_$dbuff_set_select_buffer( buffer1, vpid, st ); check( st );
        gmr_$structure_open( scene1_id, false, st ); check( st );
        gmr_$structure_erase( st ); check( st );
        create_scene();
        gmr_$structure_close( true, st ); check( st );
    }
endif /*******************************************************************************
*                                                                              *
*   EVENTS                                                                     *
*                                                                              *
*   PROCEDURE: ENABLE AND PROCESS EVENTS.                                      *
*                                                                              *
*******************************************************************************/
void    events()
#define         set_size            256
define         system_resolution   0.000004 time_$clock_t           clock1, clock2;
gmr_$event_t            type;
char                    data;
gmr_$keyset_t           keyset;
gmr_$f3_point_t         current_pos;
static float            elapsed_time  = 0.0;
static boolean          on            = true;
static boolean          pause         = false;

/*** TURN THE CURSOR OFF ***/
    gmr_$cursor_set_active( false, st ); check( st );

/*** ENABLE THE Q(UIT) KEY ***/
    lib_$init_set( keyset, set_size );
    lib_$add_to_set( keyset, set_size, 'q' );
    lib_$add_to_set( keyset, set_size, 'Q' );
    lib_$add_to_set( keyset, set_size, 'p' );
    lib_$add_to_set( keyset, set_size, 'P' );
    lib_$add_to_set( keyset, set_size, 'd' );
    lib_$add_to_set( keyset, set_size, 'D' );
    lib_$add_to_set( keyset, set_size, ' ' );

/*** ENABLE INPUTS AND CHECK FOR THE OCCURRANCE OF AN EVENT ***/
    gmr_$input_enable( gmr_$keystroke, keyset, st ); check( st );
    gmr_$input_event_wait( false, type, data, current_pos, st ); check( st );

/*** ENTER DRIVING EVENT LOOP THAT CONTROLS ALL SCREEN ACTIVITY AND I/O ***/
    time_$clock( clock2 );
```

```
        while ( on )
        {
            clock1 = clock2;
            if ( !pause )
            {
                update_traffic( elapsed_time );
                calc_threat();
#if dual_window
                sort_traffic_2();
#else
                sort_traffic();
#endif
                animate_scene();
            } if ( type == gmr_$keystroke )
            {
                switch( (data & 0xff) )
                {
                    case 'p'                    :
                    case 'P'                    :  gmr_$print_display( postfile, (short)
                                                      strlen( postfile ), gmr_$po:
                                                      break;

case 'q'                    :
                    case 'Q'                    :  on = false;
                                                   break;
/* new code for processing declutter function #if dual_window */
                    case 'd'                    :
                    case 'D'                    :  declutter = declutter + 1;
                                                   if (declutter > 3) declutter = 0;
                                                   break;
                    case ' '                    :  pause = !pause;
                                                   break;
                }
            }
            gmr_$input_event_wait(false, type, data, current_pos, st);  check( st );
            time_$clock( clock2 );
            elapsed_time = (float)( ( clock2.c2.low32 - clock1.c2.low32 ) * system_resolution );
            if ( elapsed_time > 4.0 )
                elapsed_time = 0.0;
        }
}

/****************************************************************************
 *                                                                          *
 *      MAIN                                                                *
 *                                                                          *
 *      MAIN FUNCTION:  INITIALIZE EVERYTHING YOU CAN GET YOUR              *
 *                      HANDS ON THEN START THE BIG TREADMILL               *
 *                      A ROLLIN'.  CLEAN UP WHEN YOU'RE FINISHED.          *
 *                                                                          *
 ****************************************************************************/
main( argc, argv )
int     argc;
char    *argv[];
{
char    gmfile[ 80 ];

if ( argc != 2 )
    {
        printf( "WRONG NUMBER OF ARGUMENTS -- I NEED THE GMR FILE NAME!!\n" );
        pgm_$exit();
    }

/*** INITIALIZE AND SORT TRAFFIC ***/
    init_traffic();
    sort_traffic();

/*** INITIALIZE THE 3DGMR PACKAGE, OPEN A 3D-METAFILE, AND SET UP THE COLOR TABLE ***/
    strcpy( gmfile, argv[ 1 ] );
    strcpy( postfile, argv[ 1 ] );
    strcat( postfile, ".post" );
    gmr_$init( gmr_$direct, stream_$stdout, bitmap_size, plane_cnt, st ); check( st );
    gmr_$file_create( gmfile, (short)strlen( gmfile ), gmr_$overwrite, gmr_$lw, file_id, st );
            check( st );
    set_color();

/*** CREATE TRAFFIC SYMBOLS ***/
#if dual_window
    create_symbols_2();
#endif
    create_symbols();
```

```
    /*** CREATE A VIEWPORT AND SELECT BUFFER #1 TO BE UPDATED ***/
    gmr_$viewport_create( obj_vp_ldc, vpid, st ); check( st );
#if dual_window
    gmr_$viewport_create( obj_vp_ldc_2, vpid_2, st ); check( st );
#endif
    gmr_$dbuff_set_mode( buffer_mode, st ); check( st );
    gmr_$dbuff_set_select_buffer( gmr_$1st_buffer, vpid, st ); check( st );
#if dual_window
    gmr_$dbuff_set_select_buffer( gmr_$1st_buffer, vpid_2, st ); check( st );
endif /* CREATE THE FIRST SCENE STRUCTURE AND RENDER THE FIRST FRAME */
    gmr_$structure_create( "", 0, scene1_id, st ); check( st );
    create_scene();
    gmr_$structure_close( true, st ); check( st );

/*** SETUP THE DESIRED VIEWING PARAMETERS ***/
#if dual_window
    viewing_params_2( vpid_2 );
#endif
    viewing_params( vpid );

/*** CREATE THE SECOND SCENE STRUCTURE ***/
    gmr_$structure_create( "", 0, scene2_id, st );
    gmr_$structure_close( true, st ); check( st );

/*** PROCCESS I/O EVENTS AND RENDER THE DYNAMIC TRAFFIC SCENERY ***/
    events();

/*** CLEAN UP AND EXIT ***/
    gmr_$file_close( true, st ); check( st );
    gmr_$terminate( st ); check( st );

/****************************************************************************
 *                                                                          *
 *  TCAS_PERS_AIRPLANE:  THIS FILE CONTAINS THE PROCEDURES REQUIRED FOR THE PERSPECITVE *
 *              VIEW TCAS FORMAT.  WHEN THIS FILE IS LINKED WITH "COMMON_TCAS.BIN"    *
 *              AN EXECUTABLE FILE IS CREATED   THE FORMAT USES ROTATING AIRPLANES. *
 *                                                                          *
 *                                                                          *
 *                                                                          *
 ****************************************************************************/ systype "sys5"
include <stdio.h>
#include <math.h>
#include "/sys/ins/base.ins.c";
#include "/sys/ins/error.ins.c";
#include "/sys/ins/gmr3d.ins.c";
#include "/sys/ins/vfmt.ins.c";

#define     PI              3.1415927
#define     red             8
#define     yellow          9
#define     cyan            10
#define     magenta         11
#define     white           12
#define     max_traffic     7
define     dual_window     0                       /* 1 = inside/out + plan view    */ extern  status_$t       st;                         /* returns status of 3DGMR routines */
extern  short           declutter;                  /* decluttering function         */ gmr_$structure_id_t     circle_id;                  /* circle of unit radius         */
gmr_$structure_id_t     circles_id;                 /* circles surrounding my airplane */
gmr_$structure_id_t     spokes_id;                  /* spokes on the circles         */
gmr_$structure_id_t     my_alt_id;                  /* circle and spoke plateau      */
gmr_$structure_id_t     direction_id;               /* scaled direction shaft        */
gmr_$structure_id_t     up_direction_id;            /* scaled direction indicator    */
gmr_$structure_id_t     down_direction_id;          /* scaled direction indicator    */
gmr_$structure_id_t     jet_airplane_id;            /* airplane symbol (Jet shape)   */
gmr_$structure_id_t     prox_ac_id;                 /* prox airplane symbol          */
gmr_$structure_id_t     ta_ac_id;                   /* traffic advisory symbol       */
gmr_$structure_id_t     ra_ac_id;                   /* resolution advisory symbol    */
gmr_$structure_id_t     prox_id;                    /* prox filled symbol            */
gmr_$structure_id_t     ta_id;                      /* traffic advisory filled symbol */
gmr_$structure_id_t     ra_id;                      /* resolution advisory filled symbol */
gmr_$structure_id_t     my_plane_id;                /* my scaled & rotated plane symbol */
gmr_$structure_id_t     range_max_id;               /* 6 NM range ring               */
gmr_$f3_vector_t        scale_airplane = { 0.13333, 0.13333, 1.0 };
                                                    /* scaling vector for airplanes  */
```

```
typedef enum      ( xy, xz, yz ) planes_t;
planes_t          plane;                  /* the 3 planes symbols can lie in   */
typedef enum      ( prox, ta, ra ) threat_level_t;
typedef enum      ( up, down, none ) v_direction_t;
typedef struct {
    boolean           active;             /* active status flag                */
    boolean           contender;          /* denotes possible threat           */
    threat_level_t    threat_level;       /* threat of traffic - prox, ta, ra  */
    gmr_$f3_vector_t  position;           /* 3d location of traffic symbol     */
    v_direction_t     v_direction;        /* vertical direction indicator      */
    boolean           alt_known;          /* valid altitude data indicator     */
    float             az_dist;            /* azimuth distance from my plane    */
    float             vx;                 /* constant x velocity of symbol     */
    float             vy;                 /* constant y velocity of symbol     */
    float             vz;                 /* constant z velocity of symbol     */
    float             lambda;             /* time to closest approach          */
    float             r_closest;          /* point of closest approach         */
) traffic_t;
traffic_t         traffic[ max_traffic ]; /* traffic array of structures       */
gmr_$4x3_matrix_t mat;                    /* matrix used for modeling          */
gmr_$f3_vector_t  plan_translate = { 3.0, 0.0, 0.0 );
gmr_$f3_vector_t  scale1;                 /* scaling for circles & alt vector */ short             num_of_circs  = 3;
short             num_of_spokes = 12;
float             inner_radius;

/*******************************************************************************
 *                                                                              *
 *      CIRCLE                                                                  *
 *                                                                              *
 *      PROCEDURE: GENERATES A CIRCLE OF A SPECIFIED NUMBER OF LINE SEGMENTS BY *
 *                 TRAVELING AROUND THE UNIT CIRCLE.  THE MORE LINE SEGMENTS THE*
 *                 CLOSER YOU GET TO A CIRCLE.  THE POLYGON LIES IN THE X-Y PLANE.*
 *                                                                              *
 *      PARAMS:    IN-> DETAIL = NUMBER OF LINE SEGMENTS TO GENERATE THE POLYGON*
 *                                                                              *
 *******************************************************************************/ void circle( detail )
define    n_max 128
short      detail;

{
short                    i, n;
gmr_$f3_point_array_t    p;
float                    theta, d_theta;

if (( detail > n_max ) || ( detail < 3 ))
        n = n_max;
    else
        n = detail;
    d_theta = (float)( 2.0 * PI / n );        /* complete revolution is 2*PI, so an nth */
                                              /* portion is 2*PI/n                      */
    for ( i = 0; i < n; i++ )
    {
        theta = (float)(i * d_theta);
        p[ i ].x = cos( theta );              /* x = cos(theta)*radius where radius = 1 */
        p[ i ].y = sin( theta );              /* y = sin(theta)*radius where radius = 1 */
        p[ i ].z = 0.0;
    }
    p[ n ] = p[ 0 ];
    gmr_$f3_polyline( (short)(n+1), p, false, st ); check( st );
}

/*******************************************************************************
 *                                                                              *
 *      FILLED_SYMBOL                                                           *
 *                                                                              *
 *      PROCEDURE: GENERATES THE SCALED FILLED SYMBOL WITH POLYLINE FOR THREAT TYPES *
 *                                                                              *
 *******************************************************************************/ void filled_symbol(n)
short                    n;

{
gmr_$f3_point_array_t    p;
```

```
    if (n == 0)   /* finish up for RA */
    {
        p[0].x = .3*scale_airplane.x;
        p[0].y = .0*scale_airplane.y;
        p[0].z = .0;
        p[1].x = .3*scale_airplane.x;
        p[1].y = .5*scale_airplane.y;
        p[1].z = .0;
        p[2].x = -.3*scale_airplane.x;
        p[2].y = .5*scale_airplane.y;
        p[2].z = .0;
        p[3].x = -.3*scale_airplane.x;
        p[3].y = -.0*scale_airplane.y;
        p[3].z = .0;
        p[4] = p[0];
        gmr_Sf3_polygon( (short)5, p, st ); check( st );
    }
    if (n == 1)   /* finish up for TA */
    {
        p[0].x = .3*scale_airplane.x;
        p[0].y = .25*scale_airplane.y;
        p[0].z = .0;
        p[1].x = .26*scale_airplane.x;
        p[1].y = .4*scale_airplane.y;
        p[1].z = .0;
        p[2].x = .15*scale_airplane.x;
        p[2].y = .51*scale_airplane.y;
        p[2].z = .0;
        p[3].x = .0;
        p[3].y = .55*scale_airplane.y;
        p[3].z = .0;
        p[4].x = -.15*scale_airplane.x;
        p[4].y = .51*scale_airplane.y;
        p[4].z = .0;
        p[5].x = -.26*scale_airplane.x;
        p[5].y = .4*scale_airplane.y;
        p[5].z = .0;
        p[6].x = -.3*scale_airplane.x;
        p[6].y = .25*scale_airplane.y;
        p[6].z = .0;
        p[7].x = -.26*scale_airplane.x;
        p[7].y = .1*scale_airplane.y;
        p[7].z = .0;
        p[8].x = -.15*scale_airplane.x;
        p[8].y = -.01*scale_airplane.y;
        p[8].z = .0;
        p[9].x = .0;
        p[9].y = -.05*scale_airplane.y;
        p[9].z = .0;
        p[10].x = .15*scale_airplane.x;
        p[10].y = -.01*scale_airplane.y;
        p[10].z = .0;
        p[11].x = .26*scale_airplane.x;
        p[11].y = .1*scale_airplane.y;
        p[11].z = .0;
        p[12] = p[0];
        gmr_Sf3_polygon( (short)13, p, st ); check( st );
    }
    if (n == 2)   /* finish up for PROX */
    {
        p[0].x = .3*scale_airplane.x;
        p[0].y = .25*scale_airplane.y;
        p[1].z = .0;
        p[1].x = .0;
        p[1].y = .55*scale_airplane.y;
        p[1].z = .0;
        p[2].x = -.3*scale_airplane.x;
        p[2].y = .25*scale_airplane.y;
        p[2].z = .0;
        p[3].x = .0;
        p[3].y = -.05*scale_airplane.y;
        p[3].z = .0;
        p[4] = p[0];
        gmr_Sf3_polygon( (short)4, p, st ); check( st );
    }

/*******************************************************************************
*                                                                              *
*       AIRPLANE_SYMBOL                                                        *
*                                                                              *
*       PROCEDURE: GENERATES THE SCALED AIRPLANE SYMBOL WITH POLYLINE          *
*                                                                              *
*******************************************************************************/
```

```
void airplane_symbol(n)
short                   n;

{
gmr_$f3_point_array_t   p;
float                   scale_airx,scale_airy;

if (n < 3)
  {
    p[0].x = -1*scale_airplane.x;
    p[0].y = .25*scale_airplane.y;
    p[0].z = .0;
    p[1].x = -1.*scale_airplane.x;
    p[1].y = -.25*scale_airplane.y;
    p[1].z = .0;
    p[2].x = -.125*scale_airplane.x;
    p[2].y = -.25*scale_airplane.y;
    p[2].z = .0;
    p[3].x = -.125*scale_airplane.x;
    p[3].y = -.75*scale_airplane.y;
    p[3].z = .0;
    p[4].x = -.5*scale_airplane.x;
    p[4].y = -.75*scale_airplane.y;
    p[4].z = .0;
    p[5].x = -.5*scale_airplane.x;
    p[5].y = -1.0*scale_airplane.y;
    p[5].z = .0;
    p[6].x = .5*scale_airplane.x;
    p[6].y = -1.0*scale_airplane.y;
    p[6].z = .0;
    p[7].x = .5*scale_airplane.x;
    p[7].y = -.75*scale_airplane.y;
    p[7].z = .0;
    p[8].x = .125*scale_airplane.x;
    p[8].y = -.75*scale_airplane.y;
    p[8].z = .0;
    p[9].x = .125*scale_airplane.x;
    p[9].y = -.25*scale_airplane.y;
    p[9].z = .0;
    p[10].x = 1.0*scale_airplane.x;
    p[10].y = -.25*scale_airplane.y;
    p[10].z = .0;
    p[11].x = 1.0*scale_airplane.x;
    p[11].y = .25*scale_airplane.y;
    p[11].z = 0 ;
    if (n == 0)   /* finish up for RA */
    {
        p[12].x = .3*scale_airplane.x;
        p[12].y = .25*scale_airplane.y;
        p[12].z = .0;
        p[13].x = .3*scale_airplane.x;
        p[13].y = .5*scale_airplane.y;
        p[13].z = .0;
        p[14].x = -.3*scale_airplane.x;
        p[14].y = .5*scale_airplane.y;
        p[14].z = .0;
        p[15].x = -.3*scale_airplane.x;
        p[15].y = .25*scale_airplane.y;
        p[15].z = .0;
        p[16] = p[0];
        gmr_$f3_polyline( (short)16, p, true, st ); check( st );
    }
    if (n == 1)   /* finish up for TA */
    {
        p[12].x = .3*scale_airplane.x;
        p[12].y = .25*scale_airplane.y;
        p[12].z = .0;
        p[13].x = .21*scale_airplane.x;
        p[13].y = .46*scale_airplane.y;
        p[13].z = .0;
        p[14].x = .0;
        p[14].y = .55*scale_airplane.y;
        p[14].z = .0;
        p[15].x = -.21*scale_airplane.x;
        p[15].y = .46*scale_airplane.y;
        p[15].z = .0;
        p[16].x = -.3*scale_airplane.x;
        p[16].y = .25*scale_airplane.y;
        p[16].z = .0;
        p[17] = p[0];
        gmr_$f3_polyline( (short)17, p, true, st ); check( st );
    }
    if (n == 2)   /* finish up for PROX */
    {
```

```
                p[12].x = .3*scale_airplane.x;
                p[12].y = .25*scale_airplane.y;
                p[12].z = .0;
                p[13].x = .0;
                p[13].y = .55*scale_airplane.y;
                p[13].z = .0;
                p[14].x = -.3*scale_airplane.x;
                p[14].y = .25*scale_airplane.y;
                p[14].z = .0;
                p[15] = p[0];
                gmr_$f3_polyline( (short)15, p, true, st ); check( st );
        }
    }
    else
    {
        scale_airx = scale_airplane.x/194.;
        scale_airy = scale_airplane.y/194.;
        p[0].x = 0*scale_airx;
        p[0].y = 102*scale_airy;
        p[0].z = .0;
        p[1].x = 26*scale_airx;
        p[1].y = 78*scale_airy;
        p[1].z = .0;
        p[2].x = 26*scale_airx;
        p[2].y = 26*scale_airy;
        p[2].z = .0;
        p[3].x = 194*scale_airx;
        p[3].y = -24*scale_airy;
        p[3].z = .0;
        p[4].x = 194*scale_airx;
        p[4].y = -43*scale_airy;
        p[4].z = .0;
        p[5].x = 14*scale_airx;
        p[5].y = -19*scale_airy;
        p[5].z = .0;
        p[6].x = 5*scale_airx;
        p[6].y = -84*scale_airy;
        p[6].z = .0;
        p[7].x = 77*scale_airx;
        p[7].y = -114*scale_airy;
        p[7].z = .0;
        p[8].x = 78*scale_airx;
        p[8].y = -128*scale_airy;
        p[8].z = .0;
        p[9].x = 0*scale_airx;
        p[9].y = -111*scale_airy;
        p[9].z = .0;
        p[10].x = -78*scale_airx;
        p[10].y = -128*scale_airy;
        p[10].z = .0;
        p[11].x = -77*scale_airx;
        p[11].y = -114*scale_airy;
        p[11].z = 0 ;
        p[12].x = -5*scale_airx;
        p[12].y = -84*scale_airy;
        p[12].z = .0;
        p[13].x = -14*scale_airx;
        p[13].y = -19*scale_airy;
        p[13].z = .0;
        p[14].x = -194*scale_airx;
        p[14].y = -43*scale_airy;
        p[14].z = .0;
        p[15].x = -194*scale_airx;
        p[15].y = -24*scale_airy;
        p[15].z = .0;
        p[16].x = -26*scale_airx;
        p[16].y = 26*scale_airy;
        p[16].z = .0;
        p[17].x = -26*scale_airx;
        p[17].y = 78*scale_airy;
        p[17].z = .0;
        p[18] = p[0];
        gmr_$f3_polyline( (short)18, p, true, st ); check( st );
    }
}

/*******************************************************************************
*                                                                              *
*       CIRCLES                                                                *
*                                                                              *
*       PROCEDURE: GENERATES CONCENTRIC CIRCLES IN THE X-Y PLANE WITH THE OUTER MOST *
*                  CIRCLE OF UNIT RADIUS.                                      *
*                                                                              *
```

```
*       PARAMS:     IN-> NUM_OF_CIRCS = NUMBER OF CONCENTRIC CIRCLES TO GENERATE           *
*                                                                                          *
*******************************************************************************************/ circles( num_of_circs )
short   num_of_circs;
{
#define     max_circs   10
short       i, n;
float       circ_spacing;

if (( num_of_circs > max_circs ) || ( num_of_circs < 1 ))
        n = max_circs;
    else
        n = num_of_circs;
    circ_spacing = (float)(1.0 / n);

/*** GET THE IDENTITY MATRIX TO USE AS A BASE MATRIX ***/
    gmr_$4x3_matrix_identity( mat, st ); check( st );

scale1.z = (float)1.0;
    for ( i = 1; i <= n; i++ )
    {
        scale1.x = (float)(i * circ_spacing);
        scale1.y = (float)(i * circ_spacing);
        gmr_$4x3_matrix_scale( gmr_$mat_replace, scale1, mat, st ); check( st );
        gmr_$instance_transform( circle_id, mat, st ); check( st );
    }
}

/*******************************************************************************************
*                                                                                          *
*       SPOKES                                                                             *
*                                                                                          *
*       PROCEDURE: GENERATES A SERIES OF LINES RADIATING OUT FROM THE EDGES OF AN          *
*                  INNER CIRCLE AND ENDING AT AN OUTER CIRCLE OF RADIUS ONE.  THE          *
*                  BED OF SPOKES LIE IN THE X-Y PLANE.                                     *
*                                                                                          *
*       PARAMS:    IN-> NUM_OF_SPOKES = NUMBER OF SPOKES IN A 2PI SWEEP                    *
*                  IN-> INNER_RADIUS  = RADIUS OF INNER CIRCLE                             *
*                                                                                          *
*******************************************************************************************/ spokes( num_of_spokes, inner_radius )
short   num_of_spokes;
float   inner_radius;

{
#define             max_spokes  12
short               i, n;
gmr_$f3_vector_t    p[2];
float               theta;
float               d_theta;

if (( num_of_spokes > max_spokes ) || ( num_of_spokes < 1 ))
        n = max_spokes;
    else
        n = num_of_spokes;
    d_theta = (float)(2.0 * PI / n);        /* complete revolution is 2*PI, so an nth */
                                            /* portion is 2*PI/n                      */
    p[ 0 ].z = 0.0;
    p[ 1 ].z = 0.0;
    for ( i = 1; i <= n; i++ )
    {
        theta = (float)( i * d_theta );
        p[ 0 ].x = cos( theta ) * inner_radius;/* beginning of spoke at inner_radius  */
        p[ 0 ].y = sin( theta ) * inner_radius;
        p[ 1 ].x = cos( theta );                /* end of spoke at radius = 1          */
        p[ 1 ].y = sin( theta );
        gmr_$f3_polyline( (short)2, p, false, st ); check( st );
    }
}

/*******************************************************************************************
*                                                                                          *
*       MY_ALT_PLATEAU                                                                     *
*                                                                                          *
*       PROCEDURE: GENERATES MY ALTITUDE PLATEAU BY INSTANCING THE CONCENTRIC              *
*                  CIRCLES ON TOP OF THE SPOKES                                            *
```

```
my_alt_plateau()
{
    /*** GET THE IDENTITY MATRIX TO USE AS A BASE MATRIX ***/
    gmr_$4x3_matrix_identity( mat, st ); check( st );
    gmr_$instance_transform( circles_id, mat, st ); check( st );
    gmr_$instance_transform( spokes_id, mat, st ); check( st );
}

/*****************************************************************************
 *                                                                           *
 *      HORIZONTAL_TREND                                                     *
 *                                                                           *
 *      PROCEDURE: RENDERS A HORIZONTAL TIME BASED TREND VECTOR AT THE BASE OF *
 *                 A GIVEN PIECE OF TRAFFIC.                                 *
 *                                                                           *
 *      PARAMS:    INDEX = INDEX INTO TRAFFIC STRUCTURE ARRAY                *
 *                                                                           *
 *****************************************************************************/
void    horizontal_trend( index )
short   index;

gmr_$f3_vector_t    p[2];

if (declutter > 3)
    {
        gmr_$line_color( white, st );
        p[ 0 ].x = traffic[ index ].position.x + plan_translate.x;
        p[ 0 ].y = traffic[ index ].position.y + plan_translate.y;
        p[ 0 ].z = traffic[ index ].position.z + plan_translate.z;
        if (declutter==4)
        {
            p[ 1 ].x = p[ 0 ].x + traffic[ index ].vx * 5.0;
            p[ 1 ].y = p[ 0 ].y + traffic[ index ].vy * 5.0;
        }
        else
        {
            p[ 1 ].x = p[ 0 ].x - traffic[ index ].vx * 5.0;
            p[ 1 ].y = p[ 0 ].y - traffic[ index ].vy * 5.0;
        }
        p[ 1 ].z = p[ 0 ].z;
        gmr_$f3_polyline( (short)2, p, false, st );
    }
}

/*****************************************************************************
 *                                                                           *
 *      DIRECTION                                                            *
 *                                                                           *
 *      PROCEDURE: GENERATES THE DIRECTION SYMBOL WHICH IS AN ARROW.         *
 *                                                                           *
 *      PARAMS:    SCALE =>    3D SCALING VECTOR                             *
 *                                                                           *
 *****************************************************************************/
void    direction( scale )
gmr_$f3_vector_t    scale;
{
gmr_$f3_vector_t    p[ 5 ], str_pos;
    p[ 0 ].x = 0 * scale.x;
    p[ 0 ].y = 0.0 * scale.y;
    p[ 0 ].z = 1.0 * scale.z;
            str_pos.x = 0.;
            str_pos.y = 0.;
            str_pos.z = 0.;
            gmr_$text( "", (short)1, str_pos, st ); check( st );
    p[ 1 ].x = 0. * scale.x;
    p[ 1 ].y = -0.5 * scale.y;
    p[ 1 ].z = 0. * scale.z;
    p[ 2 ].x = 0.* scale.x;
    p[ 2 ].y = 0.5 * scale.y;
    p[ 2 ].z = 0. * scale.z;
    p[ 3 ] = p [ 0 ];
    gmr_$f3_polygon( (short)4, p, st ); check( st );
}
```

```
/****************************************************************************
*                                                                           *
*       SORT_TRAFFIC                                                        *
*                                                                           *
*       PROCEDURE:   SORTS THE TRAFFIC ARRAY SO THAT THE TRAFFIC SYMBOLOGY WILL BE *
*                    RENDERED IN THE PROPER ORDER TO INSURE CORRECT MASKING. PROPER *
*                    MASKING REQUIRES A SORT ON THE MAGNITUDE OF Z. TRAFFIC SHOULD *
*                    BE RENDERED FROM MOST NEGATIVE Z TO MOST POSITIVE Z.   *
*                                                                           *
****************************************************************************/
void    sort_traffic()
{
short           index, outer_loop;
traffic_t       temp;
auto    boolean not_done = true;

for ( index = 0; index < max_traffic; index++ )
        if ( !traffic[ index ].alt_known )
        {
            traffic[ index ].position.z = 0.0;
            traffic[ index ].v_direction = none;
        } for ( outer_loop = 1; ((outer_loop < max_traffic) && (not_done)); outer_loop++ )
        not_done = false;
        for ( index = 1; index < max_traffic; index++ )
        {
            if ( traffic[ index ].position.z < traffic[ (short)(index-1) ].position.z )
            {
                temp = traffic[ (short)(index-1) ];
                traffic[ (short)(index-1) ] = traffic[ index ];
                traffic[ index ] = temp;
                not_done = true;
            }
        }

/****************************************************************************
*                                                                           *
*       TRAFFIC_SYMBOL                                                      *
*                                                                           *
*       PROCEDURE:   INSTANCES THE TRAFFIC SYMBOLS AT THE APPROPRIATE LOCATIONS *
*                    AND THEN RENDERS THE NUMERIC DATA TAGS. RENDERING COLOR IS *
*                    ALSO CHOSEN AT THIS TIME BASED UPON LEVEL OF THREAT.   *
*                                                                           *
*       PARAMS:      INDEX => INDEX INTO THE TRAFFIC STRUCTURE ARRAY.       *
*                                                                           *
****************************************************************************/
void    traffic_symbol( index )
short   index;

static  gmr_$f3_vector_t        neg_arrow_trans = {  0.09, 0.06, 0.0 };
static  gmr_$f3_vector_t        pos_arrow_trans = { -0.09, 0.06, 0.0 };
gmr_$structure_id_t     airplane_id;            /*      airplane symbol           */
gmr_$structure_id_t     filled_id;              /*      airplane filled symbol    */
gmr_$string_t                   alt_str;
float                           distance, f_theta, text_scale, fill_tran_x, z_val;
double                          ang, x_val, y_val, theta;
short                           length, altitude, i, line_type, z_count;
gmr_$f3_point_t                 str_pos;
gmr_$f3_vector_t                t_scale, t_translate, p[10];

t_scale.x = .8;
    calc_threat( index );
    if ( traffic[ index ].threat_level == ra )
    {
        gmr_$fill_color( red, st ); check( st );
        gmr_$line_color( red, st ); check( st );
        gmr_$text_color( red, st ); check( st );
        if ((declutter == 0) || (declutter == 3)) t_scale.x = 1.25;
        filled_id = ra_id;
    }
    else
        if ( traffic[ index ].threat_level == ta )
        {
            gmr_$fill_color( yellow, st ); check( st );
            gmr_$line_color( yellow, st ); check( st );
            gmr_$text_color( yellow, st ); check( st );
            if ((declutter == 0) || (declutter == 3)) t_scale.x = 1.0;
            filled_id = ta_id;
```

```
        }
        else
        {
            gmr_$fill_color( cyan, st ); check( st );
            gmr_$line_color( cyan, st ); check( st );
            gmr_$text_color( cyan, st ); check( st );
            filled_id = prox_id;
        }
airplane_id = jet_airplane_id;
t_translate.x = 0;
t_translate.y = -.25*scale_airplane.y*t_scale.x;
t_translate.z = 0;
t_scale.y = t_scale.x;
t_scale.z = 1.0;
text_scale = .065*t_scale.x;

gmr_$text_height( text_scale, st ); check( st );

x_val = traffic[index].vx;
y_val = traffic[index].vy;
theta = atan2(y_val,x_val);
f_theta = PI*1.5 + theta;
gmr_$4x3_matrix_scale(gmr_$mat_replace,t_scale,mat,st);check(st);
gmr_$4x3_matrix_rotate(gmr_$mat_post_mult, gmr_$z_axis,f_theta,mat,st);check(st);
gmr_$4x3_matrix_translate( gmr_$mat_post_mult, traffic[ index ].position, mat , st ); check( st );
gmr_$4x3_matrix_translate( gmr_$mat_post_mult, plan_translate, mat , st );
gmr_$instance_transform( airplane_id, mat, st ); check( st );

t_translate.x += traffic[index].position.x;
t_translate.y += traffic[index].position.y;
gmr_$4x3_matrix_scale(gmr_$mat_replace,t_scale,mat,st);check(st);
gmr_$4x3_matrix_translate( gmr_$mat_post_mult, t_translate, mat , st );
gmr_$4x3_matrix_translate( gmr_$mat_post_mult, plan_translate, mat , st );
if ( traffic[ index ].alt_known )
{
    if ((traffic[ index ].position.z < -0.3) && (traffic[ index ].position.z > -0.3))
        gmr_$fill_style( gmr_$fill_solid, st );
    else gmr_$fill_style( gmr_$fill_hollow, st );
    check( st );
    gmr_$instance_transform( filled_id, mat, st ); check( st );
    gmr_$fill_style( gmr_$fill_solid, st );
    if ((declutter == 1)||(declutter == 2)) gmr_$line_color( white, st ); check( st );
    p[0].x = traffic[index].position.x + plan_translate.x;
    p[0].y = traffic[index].position.y + plan_translate.y;
    p[0].z = 0;
    z_val = traffic[index].position.z;
    line_type = 3;
    z_count = z_val*256.0;
    if (z_count < 0)
    {
        z_count = -z_count;
        line_type = 1;
    }
    z_count = (z_count >> 5) + 1;
    for (i=1; i < z_count; i++)
    {
        p[i] = p[0];
        p[i].z = i*.125;
        if (z_val < 0) p[i].z = -p[i].z;
    }
    p[z_count] = p[0];
    p[z_count].z = z_val;
    i = (z_count+1)>>1;
    i = i+1;
    gmr_$line_type(line_type,st); check(st);
    gmr_$f3_multiline( i, p, st ); check( st );
    for (i=0; i<z_count; i++) p[i] = p[i+1];
    i = z_count>>1;
    i = i+i;
    line_type = 4-line_type;
    gmr_$line_type(line_type,st); check(st);
    if (z_count > 1) gmr_$f3_multiline( i, p, st ); check( st );
    gmr_$line_type((short)1,st); check(st);

if (declutter > 1)
    {
        if ((declutter == 3) || !( traffic[ index ].threat_level == prox ))

{
            theta = theta + PI*1.2;
            t_translate.x = traffic[index].position.x + .19*cos(theta)*t_scale.x + plan_translate.x;
            t_translate.y = traffic[index].position.y + .19*sin(theta)*t_scale.x + plan_translate.y;
            t_translate.z = traffic[index].position.z;
            altitude = (short)(traffic[ index ].position.z * 40);
```

```
              vfmt_$encode2( "%3ZPWD%$", alt_str, (short)80, length, altitude, 0 );
              t_translate.x = t_translate.x + text_scale*.5;
              t_translate.y = t_translate.y - text_scale*1.0;
              gmr_$text( alt_str, length, t_translate, st ); check( st );
/*              t_translate.y = t_translate.y + text_scale*2.5;
              t_translate.z += .04*t_scale.x;
              gmr_$4x3_matrix_scale(gmr_$mat_replace,t_scale,mat,st);check(st);
              gmr_$4x3_matrix_translate( gmr_$mat_post_mult, t_translate, mat , st ); check( st );

switch( traffic[ index ].v_direction )
              {
                  case( up )   : gmr_$instance_transform( up_direction_id, mat, st ); check( st );
                                 gmr_$instance_transform( direction_id, mat, st ); check( st );
                          break;
                  case( down ) : gmr_$instance_transform( down_direction_id, mat, st ); check( st );
                                 gmr_$instance_transform( direction_id, mat, st ); check( st );
                          break;
              }
*/        theta = theta - PI*1.2;
          }
      }
      if (!(declutter == 2))
      {
              if (declutter == 0) gmr_$fill_style( gmr_$fill_hollow, st ); */
          theta = theta + PI*1.45;
          t_translate.x = traffic[index].position.x + .13*cos(theta)*t_scale.x + plan_translate.x;
          t_translate.y = traffic[index].position.y + .13*sin(theta)*t_scale.x + plan_translate.y;
          t_translate.z = traffic[index].position.z;
          gmr_$4x3_matrix_scale(gmr_$mat_replace,t_scale,mat,st);check(st);
          gmr_$4x3_matrix_translate( gmr_$mat_post_mult, t_translate, mat , st ); check( st );

switch( traffic[ index ].v_direction )
          {
              case( up )   : gmr_$instance_transform( up_direction_id, mat, st ); check( st );
                      break;
              case( down ) : gmr_$instance_transform( down_direction_id, mat, st ); check( st );
                      break;
          }
          theta = theta - PI*0.9;
          t_translate.x = traffic[index].position.x + .13*cos(theta)*t_scale.x + plan_translate.x;
          t_translate.y = traffic[index].position.y + .13*sin(theta)*t_scale.x + plan_translate.y;
          t_translate.z = traffic[index].position.z;
          gmr_$4x3_matrix_scale(gmr_$mat_replace,t_scale,mat,st);check(st);
          gmr_$4x3_matrix_translate( gmr_$mat_post_mult, t_translate, mat , st ); check( st );

switch( traffic[ index ].v_direction )
          {
              case( up )   : gmr_$instance_transform( up_direction_id, mat, st ); check( st );
                      break;
              case( down ) : gmr_$instance_transform( down_direction_id, mat, st ); check( st );
                      break;
          }
          gmr_$fill_style( gmr_$fill_solid, st );
      }
      if (declutter == 2)
      {
          gmr_$fill_color( white, st ); check( st );
          gmr_$line_color( white, st ); check( st );
          t_translate.x = traffic[index].position.x + plan_translate.x;
          t_translate.y = traffic[index].position.y + plan_translate.y;
          t_translate.z = traffic[index].position.z;
          if ((t_translate.z > 0) && (traffic[index].v_direction == down))
              t_translate.z += .04*t_scale.x;
          if ((t_translate.z < 0) && (traffic[index].v_direction == up))
              t_translate.z += -.04*t_scale.x;
          gmr_$4x3_matrix_scale(gmr_$mat_replace,t_scale,mat,st);check(st);
          gmr_$4x3_matrix_translate( gmr_$mat_post_mult, t_translate, mat , st ); check( st );

switch( traffic[ index ].v_direction )
          {
              case( up )   : gmr_$instance_transform( up_direction_id, mat, st ); check( st );
                      break;
              case( down ) : gmr_$instance_transform( down_direction_id, mat, st ); check( st );
                      break;
          }
      }
  }
}
```

```
/*******************************************************************************
 *                                                                              *
 *      CREATE_SCENE                                                            *
 *                                                                              *
 *      PROCEDURE: GENERATES A COMPOSITE SCENE BY RENDERING ONLY THOSE TRAFFIC  *
 *                 SYMBOLS THAT RESIDE WITHIN THE DESIGNATED VIEWING VOLUME.    *
 *                                                                              *
 *******************************************************************************/
void    create_scene()
{
static  gmr_$text_height_t      text_scale      = 0.05;
auto    boolean                 not_drawn       = true;
short                           index;

gmr_$fill_style( gmr_$fill_solid, st ); check( st );
    gmr_$fill_inten( (float)1.0, st ); check( st );
    gmr_$line_inten( (float)1.0, st ); check( st );
    for ( index = 0; index < max_traffic; index++ )
    {
        if ( (traffic[ index ].az_dist < 1.0) &&
             (traffic[ index ].position.z < 0.75) &&
             (traffic[ index ].position.z > -0.375) )
        {
            if ( ( traffic[ index ].position.z >= 0.0 ) && ( not_drawn ) )
            {
                gmr_$fill_color( white, st ); check( st );
                gmr_$line_color( white, st ); check( st );
                gmr_$4x3_matrix_identity( mat, st ); check( st );
                gmr_$4x3_matrix_translate( gmr_$mat_post_mult, plan_translate, mat , st );
                gmr_$instance_transform( my_plane_id, mat, st ); check( st );
                gmr_$fill_inten( (float)0.6, st ); check( st );
                gmr_$line_inten( (float)0.6, st ); check( st );
                gmr_$fill_style( gmr_$fill_hollow, st ); check( st );
                gmr_$instance_transform( my_alt_id, mat, st ); check( st );
                gmr_$fill_style( gmr_$fill_solid, st ); check( st );
                not_drawn = false;
                gmr_$line_inten( (float)1.0, st ); check( st );
                gmr_$fill_inten( (float)1.0, st ); check( st );
            }
            traffic_symbol( index );
            horizontal_trend( index );
        }
    }
    if ( not_drawn )
    {
        gmr_$fill_color( white, st ); check( st );
        gmr_$line_color( white, st ); check( st );
        gmr_$4x3_matrix_identity( mat, st ); check( st );
        gmr_$4x3_matrix_translate( gmr_$mat_post_mult, plan_translate, mat , st );
        gmr_$instance_transform( my_plane_id, mat, st ); check( st );
        gmr_$fill_inten( (float)0.6, st ); check( st );
        gmr_$line_inten( (float)0.6, st ); check( st );
        gmr_$fill_style( gmr_$fill_hollow, st ); check( st );
        gmr_$instance_transform( my_alt_id, mat, st ); check( st );
    }
}

/*******************************************************************************
 *                                                                              *
 *      VIEWING_PARAMS                                                          *
 *                                                                              *
 *      PROCEDURE:  GIVEN A VIEWPORT_ID, SETUP VIEWING PARAMETERS THAT          *
 *                  DEFINE HOW WE LOOK AT THE WORLD.                            *
 *                                                                              *
 *      PARAMS:     VPID => VIEWPORT ID FOR VEIWING PARAMETERS.                 *
 *                                                                              *
 *******************************************************************************/
void    viewing_params( vpid )
gmr_$viewport_id_t      vpid;
{
static  gmr_$f3_point_t         ref_point       = { 4.0+3.0, 0.0, 2.5 };
static  gmr_$f3_vector_t        normal          = { 4.0, 0.0, 2.5 };
static  gmr_$f3_vector_t        up_vec          = { -1.0, 0.0, 0.0 };
static  gmr_$f2_limits_t        window          = {-1.0, 1.0, -1.0, 1.0 };
static  gmr_$f_t                h_dist          = -0.1;
static  gmr_$f_t                v_dist          = -4.0;
static  gmr_$f_t                y_dist          = -15.0;
static  gmr_$projection_t       proj            = gmr_$perspective;
static  gmr_$coord_system_t     coord_sys       = gmr_$coord_right;
static  gmr_$border_width_t     obj_border      = { 1, 1, 1, 1 };
```

```
     gmr_$view_set_reference_point( vpid, ref_point, st ); check( st );
     gmr_$view_set_view_plane_normal( vpid, normal, st ); check( st );
     gmr_$view_set_up_vector( vpid, up_vec, st ); check( st );
     gmr_$view_set_view_distance( vpid, v_dist, st ); check( st );
     gmr_$view_set_hither_distance( vpid, h_dist, st ); check( st );
     gmr_$view_set_yon_distance( vpid, y_dist, st ); check( st );
     gmr_$view_set_window( vpid, window, st ); check( st );
     gmr_$view_set_projection_type( vpid, proj, st ); check( st );
     gmr_$view_set_coord_system( vpid, coord_sys, st ); check( st );
     gmr_$viewport_set_shading_mode( vpid, gmr_$shading_attrib, gmr_$render_filled,
                                     gmr_$hs_no_hidden_surface, st ); check( st );
}

/****************************************************************************
 *                                                                          *
 *     CREATE_SYMBOLS                                                       *
 *                                                                          *
 *     PROCEDURE:  CREATE TRAFFIC SYMBOL STRUCTURES TO BE USED LATER.       *
 *                                                                          *
 ****************************************************************************/
void    create_symbols()
{
static  gmr_$f3_vector_t    scale_ast           = { 0.025, 0.025, 0.025 };
static  gmr_$f3_vector_t    down_scale_direction = { 0.04, 0.04, -0.04 };
static  gmr_$f3_vector_t    up_scale_direction   = { 0.04, 0.04, 0.04 };
static  gmr_$f3_vector_t    scale_plane         = { 0.05, 0.05, 0.05 };
static  gmr_$f3_vector_t    scale_me            = { 0.05, 0.06, 0.06 };
gmr_$f3_vector_t    p[ 3 ];

/*** CREATE A CIRCLE OF UNIT RADIUS IN THE X-Y PLANE ***/
    gmr_$structure_create( "", 0, circle_id, st ); check( st );
    circle( 40 );
    gmr_$structure_close( true, st ); check( st );

/*** CREATE CONCENTRIC CIRCLES IN THE X-Y PLANE WITH THE OUTER MOST CIRCLE OF UNIT RADIUS ***/
    gmr_$structure_create( "", 0, circles_id, st ); check( st );
    circles( num_of_circs );
    gmr_$structure_close( true, st ); check( st );

/*** CREATE SPOKES OF UNIT LENGTH LYING IN THE X-Y PLANE RADIATING OUT FROM THE ORIGIN ***/
    gmr_$structure_create( "", 0, spokes_id, st ); check( st );
    inner_radius = (float)( 1.0 / num_of_circs );
    spokes( num_of_spokes, inner_radius );
    gmr_$structure_close( true, st ); check( st );

/*** CREATE MY ALTITUDE PLATEAU BY INSTANCING THE SPOKES ON THE CIRCLES ***/
    gmr_$structure_create( "", 0, my_alt_id, st ); check( st );
    my_alt_plateau();
    gmr_$structure_close( true, st ); check( st );

/*** CREATE THE DIRECTION SYMBOL IN THE X-Y PLANE ***/
    gmr_$structure_create( "", 0, down_direction_id, st ); check( st );
    direction( down_scale_direction );
    gmr_$structure_close( true, st ); check( st );

/*** CREATE THE DIRECTION SYMBOL IN THE X-Y PLANE ***/
    gmr_$structure_create( "", 0, up_direction_id, st ); check( st );
    direction( up_scale_direction );
    gmr_$structure_close( true, st ); check( st );

/*** CREATE THE DIRECTION ARROW SHAFT IN THE X-Y PLANE ***/
    gmr_$structure_create( "", 0, direction_id, st ); check( st );
    p[ 0 ].x = 0 ;
    p[ 0 ].y = 0.0;
    p[ 0 ].z = up_scale_direction.z;
    p[ 1 ].x = 0;
    p[ 1 ].y = 0.0;
    p[ 1 ].z = -up_scale_direction.z;
    gmr_$f3_polyline( (short)2, p, false, st ); check( st );
    gmr_$structure_close( true, st ); check( st );

/*** CREATE THE SCALED AIRPLANE SYMBOL FOR RA ***/
    gmr_$structure_create( "", 0, ra_ac_id, st ); check( st );
    airplane_symbol((short)0);
    gmr_$structure_close( true, st ); check( st );

/*** CREATE THE SCALED AIRPLANE SYMBOL FOR TA ***/
    gmr_$structure_create( "", 0, ta_ac_id, st ); check( st );
    airplane_symbol((short)1);
    gmr_$structure_close( true, st ); check( st );
```

```
/*** CREATE THE SCALED AIRPLANE SYMBOL FOR PROX ***/
gmr_$structure_create( "", 0, prox_ac_id, st ); check( st );
airplane_symbol((short)2);
gmr_$structure_close( true, st ); check( st );

/*** CREATE THE SCALED JET AIRPLANE SYMBOL ***/
gmr_$structure_create( "", 0, jet_airplane_id, st ); check( st );
airplane_symbol((short)3);
gmr_$structure_close( true, st ); check( st );

/*** CREATE THE SCALED FILLED SYMBOL FOR RA ***/
gmr_$structure_create( "", 0, ra_id, st ); check( st );
filled_symbol((short)0);
gmr_$structure_close( true, st ); check( st );

/*** CREATE THE SCALED FILLED SYMBOL FOR TA ***/
gmr_$structure_create( "", 0, ta_id, st ); check( st );
filled_symbol((short)1);
gmr_$structure_close( true, st ); check( st );

/*** CREATE THE SCALED FILLED SYMBOL FOR PROX ***/
gmr_$structure_create( "", 0, prox_id, st ); check( st );
filled_symbol((short)2);
gmr_$structure_close( true, st ); check( st );

/*** CREATE MY AIRPLANE SYMBOL ***/
gmr_$structure_create( "", 0, my_plane_id, st ); check( st );
stick_plane( scale_me );
/*chevron( scale_me );*/
gmr_$structure_close( true, st ); check( st );
```

The below-listed TCAS inside/out source file shows how a traffic symbol changes in size, shape, color, or extends dimension so as to indicate distance or altitude change, or whether a traffic entity is approaching or receding from an own craft. The TCAS inside/out and common source files are written in "C" language.

The "C" programming language is well known in the art of computer science. One reference, like others, C Programming Language, 2nd edition, by Brian Kernighan and Dennis Ritchie (Prentice Hall 1988), provides the basis for understanding and using the "C" language.

The traffic symbols are drawn in the procedure "traffic_symbol" which is at lines 449-672 of the TCAS inside/out source file. An input to the procedure is a structure "traffic" of type "traffic_t" (line 450). This structure is provided by the TCAS communications computer (simulated by the above-listed TCAS common source file) which is responsible for detecting, reporting and tracking the individual airplanes around this own craft. The attributes of the "traffic_t" are described in lines 54-67. The primary data of interest is the position (x,y,z) (line 58) of the traffic, its threat level (line 56) (which controls the shape of the traffic symbol), and its trend data (lines 62-64) (especially vertical.)

The same procedure (traffic_symbol) calculates the distance of the traffic to own position by calling "traffic_distance" (lines 421-37) which solves the square root of the sum of the squares for x,y,z. Note the x,y,z position of the traffic is normalized in the range of −1 of +1, where 0 is the own aircraft position and 1 is the currently selected range (e.g., 6 nautical miles is a common range). It then does two iterations through the main loop (lines 460-670), once for current position, and a second time for the estimated position of the traffic after 5 seconds (lines 464-66) (note that the estimated target is dashed, and can be disabled by the "declutter" variable (line 467)). The variable "scale" is calculated as 1.5*(1-sqrt(x*x+y*y)) with a minimum limit of 0.1, giving a range of 0.1 to 1.5 for the scaling of the symbol. Note that the scale is only based on the x and y coordinates (lines 469-471) to the traffic; however, it could also be based on total distance which includes the x, y and z coordinates.

Next the procedure (lines 460-467) calculates the azimuth angle of the traffic symbol relative to own aircraft. This is done by taking the inverse tangent of the traffic's x and y coordinate and then calling the procedure (line 473) "angle_convert" (lines 282-316) to convert the angle into the horizontal position on the grid. Notice that there is a conditional compiler flag "rear_view" (line 473 for both views) that permits the program to either generate a forward and rear view or just the forward view ("#else"—line 475). This description is only interested in the rear view option since the forward view is a subset. Now if the traffic altitude is known, the vertical height of the traffic is set to 2 times the traffic z value, else it is placed on the horizon (lines 484-92) (actually at 0.04).

The procedure now starts an inner loop (at the bottom of page 15) (lines 494-667) to draw the traffic symbol twice (once on the forward view and once on the rear view grid). Note that this is necessary because some traffic symbols which are directly aligned with the wings will be drawn in both views. Now based on the distance of the traffic to own craft, the procedure draws one of the main body of the traffic symbol using one of three shapes. For distance <0.25, a red square is drawn (lines 497-521), for distance <0.35 a yellow circle is drawn (lines 522-561), otherwise a cyan diamond is drawn (lines 562-588). The program checks the distance, selects the appropriate colors (using standard library routines "gmr_$fill_color" (line 502), "gmr_$line_color" (lines 524-584) and "gmr_$text_color"), fills the point array "p" with the appropriate coordinates and calls the standard library routine "gmr_$f3_polyline" to actually do the draw operation. Note that the coordinates of the symbols are calculated relative to the centroid of the symbol but with the extent of the symbol multiplied by "scale" to effect the proper size of the symbol based on its distance from own aircraft. (The centroid is at angle "azm" and height "zdist".) The square and diamond are drawn with 4 endpoints, the circle with 8. The use of distance to determine threat level was chosen as a convenient implementation, in a real system (with an actual TCAS communications computer in lieu of the TCAS common source file), the threat level (line 57) would be determined externally and then specified in the "traffic_t" variables (starting at line 450).

After the main body of the symbol is drawn, the next procedure must draw in the vertical trend data. Note that (at lines 520, 560 and 587, respectively) "a_dist" is calculated during the drawing of the target's main body (again it is scaled by "scale"). If the altitude is known and there is a vertical trend, then a directional indicator is drawn into the body of the traffic symbol (lines 596-600). If the altitude is not known, then a question mark is drawn above the target. The directional trend triangle is drawn (lines 601-20), immediately followed by the placement of the question mark (at line 623). The directional triangle is calculated equivalently to the main body of the traffic symbol (relative to the centroid azimuth and vertical height). The coordinates of the endpoints of the triangle are stored in the array "p" (fill array at 603-616) and then the standard library routine "gmr_$polygon" (line 617) is used to fill the symbol. Note that a_dist is negated for negative vertical direction (to draw the triangle facing down), that the color is the same as selected for the main body, and that each coordinate is scaled for correct size. The question mark size (for the three symbols) is also scaled by "scale" (with library routine "gmr_$text_height" (line 684) and then positioned above the symbol and drawn by standard library routine "gmr_$text".

Finally the wings of the traffic symbol are drawn. The extent of the wings are from "azm1" to "azm2" and from "azm3" to "azm4" (lines 631-664). Note that "azm2" and "azm4" are calculated during the drawing of the main body of the symbol and represent the outer edges of the square, circle or triangle. The outer edge of the wings are a fixed distance from the centroid, but this distance is again scaled by "scale" to get the correct size for the symbol. Note that for high threat symbols each wing is drawn as a filled rectangle by filling the 4 endpoints into the "p" array and calling "gmr_$f3_polygon" (solid figure) and that low threat symbols are drawn as open rectangles by calling "gmr_$f3_polyline" (line figure). Line 647 is for drawing the first wing and 663 for the second wing.

Notice that the vertical trend data and wing symbols are only drawn during the first pass (n=0, line 589) of the main loop (for current position), the second pass (n=1) (line 460) handles the predicted location of the traffic (in 5 seconds) (lines 464-6) and only draws the main body of the symbol (in dashed lines) (line 467). The final step before exiting the procedure is to change the line type back to solid (line type=1) (line 671).

TCAS INSIDE/OUT SOURCE FILE

```
/***************************************************************************
*                                           *
*TCAS_INSIDE:THIS FILE DISPLAYS THE SAME INFORMATION THAT TCAS_3 DOES, ONLY IT DOES
*       IT DYNAMICLY. THE SYMBOLOGY IS MOVED AROUND BY CONTINUELY ERASING THE
*       CONTENTS OF THE SCENE STRUCTURES, UPDATING THE TRAFFIC DATA, AND THEN
*       REDRAWING THE SCENE STRUCTURES. DOUBLE BUFFERING IS USED WITH ONE SCENE
*       STRUCTURE ASIGNED TO EACH BUFFER. THE MOUSE IS ENABLED AND USED TO SIM-
*       ULATE THE STICK OF THE OWN AIRCRAFT. LEFT AND RIGHT MOUSE MOTION CAUSES
*       THE OWN AIRCRAFT TO BANK RIGHT AND BANK LEFT RESPECTIVELY. FORWARD AND
*       BACKWARD MOTION OF THE MOUSE CAUSES THE OWN AIRCRAFT TO DESCEND AND
*       ASCEND RESPECTIVELY. FORWARD THROTTLE IS ACHIEVED BY HOLDING THE "A"
*       MOUSE BUTTON DOWN AND MOVING THE MOUSE FORWARD. BACKWARD THROTTLE IS
*       ACHIEVED BY HOLDING THE "A" MOUSE BUTTON DOWN AND MOVING THE MOUSE BACK-
*       WARDS.                              *
*                                *
*                                   *
*                                  *
*                                 *
*                                *
***************************************************************************/

1  #systype "sys5"
   #include <stdio.h>
   #include <math.h>
   #include "/sys/ins/base.ins.c";
   #include "/sys/ins/error.ins.c";
   #include "/sys/ins/ec2.ins.c"
   #include "/sys/ins/ms.ins.c"
   #include "/sys/ins/pgm.ins.c";
   #include "/sys/ins/gmr3d.ins.c";
10 #include "/sys/ins/kbd.ins.c"
   #include "/sys/ins/time.ins.c"
   #include "/sys/ins/cal.ins.c";
```

```
     #define    PI              3.1415927
     #define    dim_red         1
     #define    red             2
     #define    dim_yellow      3
     #define    yellow          4
     #define    green           2
     #define    dim_cyan        5
20   #define    cyan            6
     #define    magenta         4
     #define    dim_white       7
     #define    white           8
     #define    max_traffic     7
     #define    dual_demo       0
     #define    rear_view       1
     #define    center_ref      1
     status_St            st;              /* returns status of 3DGMR routines */
     gmr_$file_id_t       file_id;         /* file id for GMR file            */
30   gmr_$i2_point_t      bitmap_size      = {1280,1024};
                                           /* bitmap size                    */
     short                plane_cnt    = 8; /* number of color planes in system */
     short                declutter = 3;   /* line type of predictive symbols */
     short                traffic_cnt = 7; /* traffic count to be shown */
     gmr_$structure_id_t  circle_id;       /* circle of unit radius          */
     gmr_$structure_id_t  circles_id;      /* circles surrounding my airplane */
     gmr_$structure_id_t  spokes_id;       /* spokes on the circles          */
     gmr_$structure_id_t  my_alt_id;       /* circle and spoke plateau       */
                                           /* representing my altitude       */
     gmr_$structure_id_t  u_t_plane_id;    /* unit size triangle plane symbol */
     gmr_$structure_id_t  t_plane_id;      /* scaled & rotated triangle plane */
40   gmr_$structure_id_t  c_plane_id;      /* scaled & rotated circle plane  */
     gmr_$structure_id_t  azimuth_id;      /* azimuth base indicator symbol  */
     gmr_$structure_id_t  my_plane_id;     /* my scaled & rotated plane symbol */
     gmr_$structure_id_t  scene1_id;       /* the 1st composite structure id  */
     gmr_$structure_id_t  scene2_id;       /* the 2nd composite structure id  */
     gmr_$f3_vector_t     scale1;          /* scaling for circles & alt vector */
     gmr_$f3_vector_t     scale2           = { 0.03, 0.03, 0.03 };
                                           /* scaling vector for t_planes    */
     gmr_$f3_vector_t     scale3           = { 0.025, 0.025, 0.025 };
                                           /* scaling vector for c_planes    */
     gmr_$f3_vector_t     scale4           = { 0.04, 0.02, 0.04 };
                                           /* scaling vector for d_planes    */
     gmr_$f3_vector_t     scale5           = { 0.05, 0.06, 0.06 };
                                           /* scaling vector for my airplane */
50   gmr_$f3_vector_t     scale6           = { 0.03, 0.03, 0.0 };
                                           /* scaling vector for azimuth base */
     gmr_$f3_vector_t     RV_scale         = { 1.0, -1.0, 1.0 };
     typedef enum         { prox, ta, ra } threat_level_t;
     typedef enum         { up, down, none } v_direction_t;
     typedef struct {
         boolean          active;          /* active status flag             */
         boolean          contender;       /* denotes possible threat        */
         threat_level_t   threat_level;    /* threat of traffic - prox, ta, ra */
         gmr_$f3_vector_t position;        /* 3d location of traffic symbol  */
         v_direction_t    v_direction;     /* vertical direction indicator   */
60       boolean          alt_known;       /* valid altitude data indicator  */
         float            az_dist;         /* azimuth distance from my plane */
         float            vx;              /* constant x velocity of symbol  */
         float            vy;              /* constant y velocity of symbol  */
         float            vz;              /* constant z velocity of symbol  */
         float            lambda;          /* time to closest approach       */
```

```
       float          r_closest;        /* point of closest approach   */
     } traffic_t;
       traffic_t      traffic[ max_traffic ]; /* traffic array of structures */ gmr_$4x3_matrix_t   mat;         /* matrix used for modeling    */
70     float          inner_radius;
       short          num_of_circs  = 5;
       short          num_of_spokes = 24;
       float          deltax        = 0.0;  /* own aircraft delta in x  */
       float          deltay        = 0.0;  /* own aircraft delta in y  */
       float          deltaz        = 0.0;  /* own aircraft delta in z  */ gmr_$viewport_id_t  vpid;            /* viewport id number       */
       gmr_$viewport_id_t  vpid_2;          /* viewport id number       */
       gmr_$f3_point_t     ref_point  = { 4.0, 0.0, 0.0 };
       float               ref_dist   = 4.0;
80     gmr_$f3_vector_t    normal     = { 4.0, 0.0, 0.0 };
       gmr_$f3_vector_t    up_vec     = { 0, 0, 1 };
       gmr_$f2_limits_t    window     = { -1.0, 1.0, -1.0, 1.0 };
       gmr_$f_t            h_dist     = -3.9;
       gmr_$f_t            v_dist     = -4.0;
       gmr_$f_t            y_dist     = -15.0;

if rear_view gmr_$f3_limits_t    obj_vp_ldc   = { 0.0, 1.0, 0.401, 1.0, 0.0, 1.0 };
       gmr_$f3_limits_t    obj_vp_ldc_2 = { 0.1, 0.9, 0.0, 0.4, 0.0, 1.0 };
       gmr_$f3_point_t     ref_point_2  = {- 4.0, 0.0, 0.0 };
90     gmr_$f3_vector_t    normal_2     = { 4.0, 0.0, -0.0 };
       gmr_$f3_vector_t    up_vec_2     = { 0, 0, 1 };
       gmr_$f2_limits_t    window_2     = { -1.0, 1.0, -1.0, 1.0 };
       gmr_$f_t            h_dist_2     = 3.9;
       gmr_$f_t            v_dist_2     = 4.0;
       gmr_$f_t            y_dist_2     = 15.0;
       gmr_$coord_system_t coord_sys_2  = gmr_$coord_left;
       #else
       gmr_$f3_limits_t    obj_vp_ldc   = { 0.0, 1.0, 0.0, 1.0, 0.0, 1.0 };
       #endif
100    gmr_$projection_t   proj         = gmr_$perspective;
       gmr_$coord_system_t coord_sys    = gmr_$coord_right;
       gmr_$border_width_t obj_border   = { 1, 1, 1, 1 };

gmr_$buffer_mode_t  buffer_mode  = gmr_$double_buffer;
       gmr_$buffer_t       buffer1      = gmr_$1st_buffer;
       gmr_$buffer_t       buffer2      = gmr_$2nd_buffer;
       gmr_$buffer_t       inq_buffer;

#if dual_demo

/*** THE FOLLOWING TYPE/VARIABLE DECLARATIONS ARE IN SUPPORT OF THE ***/
       /*** EVENTCOUNT ROUTINES USED IN SYNCHRONIZING WITH HONEY_TCAS.    ***/
       /* FAA_TCAS IS THE CONSUMER AND HONEY_TCAS IS THE PRODUCER.      */ typedef struct              /* fields in mapped storage record: */
       { ec2_$eventcount_t  producer_ec;   /* producer eventcount       */
110      ec2_$eventcount_t  consumer_ec;   /* consumer eventcount       */
         boolean            been_here;     /* true when producer is waiting on */
                                           /* consumer                  */
       } shared_info_t;
```

```
long         length_mapped;        /* length of mapped data          */
shared_info_t *shared_info;        /* address of mapped storage      */
long         consumer_wait_value;  /* trigger value when waiting for */
                                   /* consumer eventcount            */
short        i;                    /* value returned by ec2_$wait    */
#endif
```

```
/**************************************************************
 *                                                            *
 *   PROCEDURE CHECK : CHECK STATUS AND PRINT ERROR           *
 *                                                            *
 **************************************************************/ check()
     {
         if (st.all != status_$ok)
120      {
             error_$print(st);
         }
     }
```

```
/**************************************************************

DM_REFRESH: PROC CALLED BY DM TO REFRESH DISPLAY

**************************************************************/ dm_refresh( unobscured, pos_change, old_dev_limits, old_max_device )
     boolean              unobscured, pos_change;
     gmr_$f3_limits_t     old_dev_limits, old_max_device;
     {
         gmr_$display_refresh( st ); check( st );
     }
```

```
/**************************************************************

SQ: RAISE X TO POWER OF N

**************************************************************/
     float sq( x, n )
130  float   x;
     short   n;
     {
     short   i;
     float   result;

result = x;
         for (i=1; i<n; i++) result *= x;
         return(result);

}
```

```
/******************************************************************************
 *                                                                            *
 *      AZIMUTH_DISTANCE                                                      *
 *                                                                            *
 *      PROCEDURE: CALCULATES THE LENGTH OF THE AZIMUTH VECTOR FROM OWN AIRCRAFT
 *                                                                            *
 *               TO THE GIVEN TRAFFIC.                                        *
 *                                                                            *
 ******************************************************************************/ float   azimuth_distance( position )
140   gmr_$f3_vector_t      position;
      {
      float   result, temp;

temp = sq( position.x, (short)2 ) + sq( position.y, (short)2 );
          result = sqrt( temp );
          return( result );
      }

/******************************************************************************
 *                                                                            *
 *      INIT_TRAFFIC                                                          *
 *                                                                            *
 *      PROCEDURE: INITIALIZES THE STRUCTURE DATA IN THE TRAFFIC ARRAY.       *
 *                                                                            *
 ******************************************************************************/ init_traffic()
      {
          traffic[ (short)0 ].active       = true;
150       traffic[ (short)0 ].contender    = true;
          traffic[ (short)0 ].threat_level = prox;
          traffic[ (short)0 ].position.x   = -0.9;
          traffic[ (short)0 ].position.y   = -0.2;
          traffic[ (short)0 ].position.z   = 0.4;
          traffic[ (short)0 ].v_direction  = down;
          traffic[ (short)0 ].alt_known    = true;
          traffic[ (short)0 ].az_dist      = azimuth_distance( traffic[ (short)0 ].position );
          traffic[ (short)0 ].vx           = 0.01;
          traffic[ (short)0 ].vy           = 0.0022;
160       traffic[ (short)0 ].vz           = -0.0044;
          traffic[ (short)0 ].lambda       = 0.00;
          traffic[ (short)0 ].r_closest    = 0.00;

traffic[ (short)1 ].active       = true;
          traffic[ (short)1 ].contender    = true;
          traffic[ (short)1 ].threat_level = prox;
          traffic[ (short)1 ].position.x   = -0.7;
          traffic[ (short)1 ].position.y   = 0.5;
          traffic[ (short)1 ].position.z   = 0.6;
          traffic[ (short)1 ].v_direction  = down;
170       traffic[ (short)1 ].alt_known    = true;
          traffic[ (short)1 ].az_dist      = azimuth_distance( traffic[ (short)1 ].position );
          traffic[ (short)1 ].vx           = 0.02;
          traffic[ (short)1 ].vy           = -0.01;
```

```
        traffic[ (short)1 ].vz            = -0.009;
        traffic[ (short)1 ].lambda        = 0.00;
        traffic[ (short)1 ].r_closest     = 0.00;

traffic[ (short)2 ].active        = true;
        traffic[ (short)2 ].contender     = true;
        traffic[ (short)2 ].threat_level  = prox;
180     traffic[ (short)2 ].position.x    = -0.4;
        traffic[ (short)2 ].position.y    = 0.8;
        traffic[ (short)2 ].position.z    = -0.3;
        traffic[ (short)2 ].v_direction   = up;
        traffic[ (short)2 ].alt_known     = true;
        traffic[ (short)2 ].az_dist       = azimuth_distance( traffic[ (short)2 ].position );
        traffic[ (short)2 ].vx            = 0.026;
        traffic[ (short)2 ].vy            = -0.022;
        traffic[ (short)2 ].vz            = 0.012;
        traffic[ (short)2 ].lambda        = 0.00;
190     traffic[ (short)2 ].r_closest     = 0.00;

traffic[ (short)3 ].active        = true;
        traffic[ (short)3 ].contender     = true;
        traffic[ (short)3 ].threat_level  = prox;
        traffic[ (short)3 ].position.x    = 0.3;
        traffic[ (short)3 ].position.y    = 0.95;
        traffic[ (short)3 ].position.z    = -0.1;
        traffic[ (short)3 ].v_direction   = up;
        traffic[ (short)3 ].alt_known     = true;
        traffic[ (short)3 ].az_dist       = azimuth_distance( traffic[ (short)3 ].position );
200     traffic[ (short)3 ].vx            = 0.0002;
        traffic[ (short)3 ].vy            = -0.017;
        traffic[ (short)3 ].vz            = 0.004;
        traffic[ (short)3 ].lambda        = 0.00;
        traffic[ (short)3 ].r_closest     = 0.00;

traffic[ (short)4 ].active        = true;
        traffic[ (short)4 ].contender     = true;
        traffic[ (short)4 ].threat_level  = prox;
        traffic[ (short)4 ].position.x    = 0.95;
        traffic[ (short)4 ].position.y    = 0.1;
210     traffic[ (short)4 ].position.z    = 0.19;
        traffic[ (short)4 ].v_direction   = down;
        traffic[ (short)4 ].alt_known     = true;
        traffic[ (short)4 ].az_dist       = azimuth_distance( traffic[ (short)4 ].position );
        traffic[ (short)4 ].vx            = -0.016;
        traffic[ (short)4 ].vy            = -0.001;
        traffic[ (short)4 ].vz            = -0.0038;
        traffic[ (short)4 ].lambda        = 0.00;
        traffic[ (short)4 ].r_closest     = 0.00;

traffic[ (short)5 ].active        = true;
220     traffic[ (short)5 ].contender     = true;
        traffic[ (short)5 ].threat_level  = prox;
        traffic[ (short)5 ].position.x    = 0.3;
        traffic[ (short)5 ].position.y    = -0.9;
        traffic[ (short)5 ].position.z    = -0.25;
        traffic[ (short)5 ].v_direction   = up;
        traffic[ (short)5 ].alt_known     = false;
        traffic[ (short)5 ].az_dist       = azimuth_distance( traffic[ (short)5 ].position );
        traffic[ (short)5 ].vx            = -0.01;
        traffic[ (short)5 ].vy            = 0.004;
```

```
230     traffic[ (short)5 ].vz          = 0.0033;
        traffic[ (short)5 ].lambda      = 0.00;
        traffic[ (short)5 ].r_closest   = 0.00;

traffic[ (short)6 ].active      = true;
        traffic[ (short)6 ].contender   = true;
        traffic[ (short)6 ].threat_level = prox;
        traffic[ (short)6 ].position.x  = -0.05;
        traffic[ (short)6 ].position.y  = -0.95;
        traffic[ (short)6 ].position.z  = 0.2;
        traffic[ (short)6 ].v_direction = none;
240     traffic[ (short)6 ].alt_known   = true;
        traffic[ (short)6 ].az_dist     = azimuth_distance( traffic[ (short)6 ].position );
        traffic[ (short)6 ].vx          = -0.00045;
        traffic[ (short)6 ].vy          = 0.017;
        traffic[ (short)6 ].vz          = 0.00;
        traffic[ (short)6 ].lambda      = 0.00;
        traffic[ (short)6 ].r_closest   = 0.00;
}
```

```
/**********************************************************************
 *                                                                    *
 *    SET_COLOR                                                       *
 *                                                                    *
 *    PROCEDURE: SETS UP THE COLOR MAP WITH TEN SHADES EACH OF RED, YELLOW, CYAN,
 *                                                                    *
 *         MAGENTA, AND WHITE. THIS PROCEDURE USES THE HUE, SATURATION, AND *
 *         VALUE SCHEME FOR GENERATING THE DESIRED COLORS.            *
 *                                                                    *
 **********************************************************************/ set_color()
{
250     static gmr_$hsv_color_t     black        = { 0.0, 0.0, 0.0 };
        static gmr_$hsv_color_t     low_red      = { 0.0, 1.0, 0.8 };
        static gmr_$hsv_color_t     high_red     = { 0.0, 1.0, 1.0 };
        static gmr_$hsv_color_t     low_yellow   = { 0.1667, 1.0, 0.8 };
        static gmr_$hsv_color_t     high_yellow  = { 0.1667, 1.0, 1.0 };
        static gmr_$hsv_color_t     low_green    = { 0.3333, 1.0, 1.0 };
        static gmr_$hsv_color_t     high_green   = { 0.3333, 1.0, 1.0 };
        static gmr_$hsv_color_t     low_cyan     = { 0.5, 1.0, 0.8 };
        static gmr_$hsv_color_t     high_cyan    = { 0.5, 1.0, 1.0 };
        static gmr_$hsv_color_t     low_magenta  = { 0.8333, 1.0, 1.0 };
260     static gmr_$hsv_color_t     high_magenta = { 0.8333, 1.0, 1.0 };
        static gmr_$hsv_color_t     low_white    = { 0.0, 0.0, 0.6 };
        static gmr_$hsv_color_t     high_white   = { 0.0, 0.0, 1.0 };

gmr_$color_set_range( (short)0, (short)0, (short)1, st ); check( st );
        gmr_$color_define_hsv( (short)0, black, black, st ); check( st );
        gmr_$color_set_range( (short)dim_red, (short)1, (short)1, st ); check( st );
        gmr_$color_define_hsv( (short)red, low_red, low_red, st ); check( st );
        gmr_$color_set_range( (short)red, (short)2, (short)1, st ); check( st );
        gmr_$color_define_hsv( (short)red, high_red, high_red, st ); check( st );
        gmr_$color_set_range( (short)yellow, (short)3, (short)1, st ); check( st );
270     gmr_$color_define_hsv( (short)yellow, low_yellow, low_yellow, st ); check( st );
        gmr_$color_set_range( (short)yellow, (short)4, (short)1, st ); check( st );
        gmr_$color_define_hsv( (short)yellow, high_yellow, high_yellow, st ); check( st );
        gmr_$color_set_range( (short)cyan, (short)5, (short)1, st ); check( st );
        gmr_$color_define_hsv( (short)cyan, low_cyan, low_cyan, st ); check( st );
        gmr_$color_set_range( (short)cyan, (short)6, (short)1, st ); check( st );
        gmr_$color_define_hsv( (short)cyan, high_cyan, high_cyan, st ); check( st );
```

```
        gmr_$color_set_range( (short)dim_white, (short)7, (short)1, st ); check( st );
        gmr_$color_define_hsv( (short)dim_white, low_white, low_white, st ); check( st );
        gmr_$color_set_range( (short)white, (short)8, (short)1, st ); check( st );
280     gmr_$color_define_hsv( (short)white, high_white, high_white, st ); check( st );
    }

/*     ANGLE_CONVERT procedure
     *
     *  Converts input angle into warped angle based on reference point
     *  distance from the origin and assuming 6 divisions per quadrant.
     */ float   angle_convert( theta )
    float       theta;
    {
    float       phi, index, new_theta;

index = 12.0*theta/PI ;
        new_theta = 0.0 ;
        if ( index < 0.0 ) index = 24.0 + index ;
        if ( index > 6.0)
290     {
            if (index < 12.0 )
            {
                index = 12.0 - index ;
                new_theta = -PI ;
            }
            else if (index < 18.0 )
            {
                index = index - 12.0 ;
                new_theta = PI ;
300         }
            else
            {
                index = 24.0 - index ;
                new_theta = -2.0*PI;
            }
        }
        if ( index > 0.0001 )
        {
            phi = 2.0*index*index/(36.0*ref_dist);
310         phi = -phi + sqrt (phi*phi + 4.0*(1.0+phi/(ref_dist*2.0))*(1.0-index*index/36.0));
            phi = phi/(2.0*(1+index*index/(36.0*ref_dist*ref_dist)));
            new_theta = acos(phi) + new_theta;
        }
        if ( new_theta < 0.0 ) new_theta = -new_theta;
        return( new_theta );
    }

/*********************************************************************************
 *                                                                   *
 *   POLYGON                                                         *
 *                                                                   *
 *   PROCEDURE: GENERATES A POLYGON OF A SPECIFIED NUMBER OF LINE SEGMENTS BY
 *
 *       TRAVELING AROUND THE UNIT CIRCLE. THE MORE LINE SEGMENTS THE   *
 *       CLOSER YOU GET TO A CIRCLE. THE POLYGON LIES IN THE X-Y PLANE. *
```

```
*                                                            *
*    PARAMS:   IN-> DETAIL = NUMBER OF LINE SEGMENTS TO GENERATE THE POLYGON
*
*                                                            *
***************************************************************************/ polygon( detail )
    #define    n_max    40
    short      detail;

320 {
    short              i, n;
    gmr_Sf3_point_array_t   p;
    float              theta, d_theta;

if (( detail > n_max ) || ( detail < 3 ))
            n = n_max;
        else
            n = detail;
        d_theta = (float)( 2.0 * PI / n );      /* complete revolution is 2*PI, so an nth */
                                                /* portion is 2*PI/n                      */
        for ( i = 0; i < n; i++ )
330     {
            theta = (float)(i * d_theta);
            p[ i ].x = cos( theta );            /* x = cos(theta)*radius where radius = 1 */
            p[ i ].y = sin( theta );            /* y = sin(theta)*radius where radius = 1 */
            p[ i ].z = 1.0;
        }
        p[ n ] = p[ 0 ];
        gmr_Sf3_polyline( (short)(n+1), p, false, st ); check( st );
    }

/***************************************************************************
*                                                            *
*    CIRCLES                                                 *
*                                                            *
*    PROCEDURE: GENERATES CONCENTRIC CIRCLES IN THE X-Y PLANE WITH THE OUTER MOST
*
*        CIRCLE OF UNIT RADIUS.                              *
*                                                            *
*    PARAMS:   IN-> NUM_OF_CIRCS = NUMBER OF CONCENTRIC CIRCLES TO GENERATE
*
*                                                            *
***************************************************************************/ circles( num_of_circs )
340 short num_of_circs;
    {
    #define    max_circs    10
        short      i, n, dash;
        float      circ_spacing;

if (( num_of_circs > max_circs ) || ( num_of_circs < 1 ))
            n = max_circs;
        else
            n = num_of_circs;
        circ_spacing = (float)(2.0 / (n - 1.0));
```

```
350     dash = 1;
        /*** GET THE IDENTITY MATRIX TO USE AS A BASE MATRIX ***/
        gmr_$4x3_matrix_identity( mat, st ); check( st );

scale1.x = (float)0.99;
        scale1.y = (float)0.99;
        for ( i = 1; i <= n; i++ )
        {
            gmr_$line_type(dash,st); check(st);
            scale1.z = (float)((i - 1.0) * circ_spacing - 1.0);
            gmr_$4x3_matrix_scale( gmr_$mat_replace, scale1, mat, st ); check( st );
            gmr_$instance_transform( circle_id, mat, st ); check( st );
360         dash = dash + 2;
            if (dash > 3) dash = 1;
        }
    }

/******************************************************************************
 *                                                                            *
 *      SPOKES                                                                *
 *                                                                            *
 *      PROCEDURE: GENERATES A SERIES OF LINES RADIATING OUT FROM THE EDGES OF AN
 *                                                                            *
 *              INNER CIRCLE AND ENDING AT AN OUTER CIRCLE OF RADIUS ONE. THE *
 *              BED OF SPOKES LIE IN THE X-Y PLANE.                           *
 *                                                                            *
 *      PARAMS:   IN-> NUM_OF_SPOKES = NUMBER OF SPOKES IN A 2PI SWEEP        *
 *                IN-> INNER_RADIUS  = RADIUS OF INNER CIRCLE                 *
 *                                                                            *
 ******************************************************************************/ spokes( num_of_spokes, inner_radius )
short   num_of_spokes;
float   inner_radius;

{
#define         max_spokes  24
short           i, n, dash;
370 gmr_$f3_vector_t    p[2];
float           theta;
float           d_theta;

if (( num_of_spokes > max_spokes ) || ( num_of_spokes < 1 ))
        n = max_spokes;
    else
        n = num_of_spokes;
    d_theta = (float)(2.0 * PI / n);        /* complete revolution is 2*PI, so an nth */
                                            /* portion is 2*PI/n                      */
    dash = 2;           /* set for dashed lines */
    p[ 0 ].z = 1.0;
380 p[ 1 ].z = -1.0;
    for ( i = 1; i <= n; i++ )
    {
        gmr_$line_type(dash,st); check(st);
        theta = (float)( i * d_theta );
        theta = angle_convert( theta );
        p[ 0 ].x = cos( theta )*.99 ;/* beginning of spoke at inner_radius    */
```

```
            p[ 0 ].y = sin( theta )*.99 ;
            p[ 1 ].x = p[ 0 ].x ;         /* end of spoke at radius = 1     */
            p[ 1 ].y = p[ 0 ].y ;
390         gmr_$f3_polyline( (short)2, p, false, st ); check( st );
            dash = dash + 1;
            if (dash > 2) dash = 1;
        }
    }
```

```
/****************************************************************************
*                                                      *
*       MY_ALT_PLATEAU                                         *
*                                                      *
*       PROCEDURE: GENERATES MY ALTITUDE PLATEAU BY INSTANCING THE CONCENTRIC
*
*              CIRCLES ON TOP OF THE SPOKES                         *
*                                                      *
****************************************************************************/ my_alt_plateau()
{
    /*** GET THE IDENTITY MATRIX TO USE AS A BASE MATRIX ***/
    gmr_$4x3_matrix_identity( mat, st ); check( st );
    gmr_$instance_transform( circles_id, mat, st ); check( st );
    gmr_$instance_transform( spokes_id, mat, st ); check( st );
400 }
```

```
/****************************************************************************
*                                                      *
*       SORT_TRAFFIC                                           *
*                                                      *
*       PROCEDURE: SORTS THE TRAFFIC ARRAY SO THAT THE TRAFFIC SYMBOLOGY WILL BE
*
*              RENDERED IN THE PROPER ORDER TO INSURE CORRECT MASKING. PROPER  *
*              MASKING REQUIRES A SINGLE SORT. FIRST THE TRAFFIC MUST BE       *
*              SORTED BY THE MAGNITUDE OF AZIMUTH DISTANCE. THE TRAFFIC IS THEN *
*              RENDERED FROM FARTHEST TO CLOSEST.                      *
*                                                      *
****************************************************************************/ sort_traffic()
{
    short       index, outer_loop;
    traffic_t   temp;
    auto boolean  not_done = true;

for ( outer_loop = 1; ((outer_loop < traffic_cnt) && (not_done)); outer_loop++ )
    {
        not_done = false;
        for ( index = 1; index < traffic_cnt; index++ )
410     {
            if ( traffic[ index ].az_dist > traffic[ (short)(index-1) ].az_dist )
            {
                temp = traffic[ (short)(index-1) ];
                traffic[ (short)(index-1) ] = traffic[ index ];
```

```
                    traffic[ index ] = temp;
                    not_done = true;
                }
            }
        }
420 }
```

```
/*******************************************************************************
 *                                                                              *
 *      TRAFFIC_DISTANCE                                                        *
 *                                                                              *
 *      PROCEDURE: CALCULATES THE LENGTH OF THE VECTOR FROM OWN AIRCRAFT TO THE *
 *              GIVEN TRAFFIC.                                                  *
 *                                                                              *
 *******************************************************************************/ float   traffic_distance( traffic )
    traffic_t   traffic;
    {
    float   result, temp;

if ( traffic.alt_known )
        {
            temp = sq( traffic.position.x, (short)2 ) + sq( traffic.position.y, (short)2 );
            result = sqrt( temp + sq( traffic.position.z, (short)2 ) );
            return( result );
430     }
        else
        {
            temp = sq( traffic.position.x, (short)2 ) + sq( traffic.position.y, (short)2 );
            result = sqrt( temp );
            return( result );
        }
    }
``` out.

```
/*******************************************************************************
 *                                                                              *
 *      DRAW_ALT_PLATEAU                                                        *
 *                                                                              *
 *      PROCEDURE: DRAWS THE ALTITUDE PLATEAU.                                  *
 *                                                                              *
 *******************************************************************************/ draw_alt_plateau()
    {
440     gmr_$4x3_matrix_identity( mat, st ); check( st );
        gmr_$fill_color( dim_white, st ); check( st );
        gmr_$line_color( dim_white, st ); check( st );
        gmr_$fill_inten( (float)1.0, st ); check( st );
        gmr_$line_inten( (float)1.0, st ); check( st );
        gmr_$fill_style( gmr_$fill_hollow, st ); check( st );
        gmr_$instance_transform( my_alt_id, mat, st ); check( st );
        gmr_$fill_style( gmr_$fill_solid, st ); check( st );
    }
```

```
/*******************************************************************************
 *                                                                             *
 *      TRAFFIC_SYMBOL                                                         *
 *                                                                             *
 *      PROCEDURE: INSTANCES THE TRAFFIC SYMBOL AS WELL AS THE ALTITUDE VECTOR *
 *                                                                             *
 *      PARAMS:    IN-> TRAFFIC = STRUCTURE CONTAINING TRAFFIC INFO            *
 *                                                                             *
 *******************************************************************************/ traffic_symbol( traffic, not_drawn )
450   traffic_t    traffic;
      boolean    . not_drawn;

{
      short          index,n,nn;
      gmr_$f3_point_array_t   p;
      float          distance, zdist, azm, azm1, azm2, azm3, azm4, scale, t_scale, a_dist ;
      gmr_$f3_point_t    str_pos;

distance = traffic_distance(traffic);
         nn = 2;
         if (declutter < 2) nn = 1;
460      for (n = 0; n<nn; n++)
         {
           if (n==1)
           {
              traffic.position.x += 5.0*traffic.vx;
              traffic.position.y += 5.0*traffic.vy;
              traffic.position.z += 5.0*traffic.vz;
              if ((declutter>>1) == 1) gmr_$line_type((short)3, st); check(st);
           }
           scale = sq( traffic.position.x, (short)2 ) + sq( traffic.position.y, (short)2 );
470        scale = 1.5 - sqrt(scale)*1.5;
           if (scale < 0.1 ) scale = 0.1;

if ((traffic.position.y == 0.0) && (traffic.position.x == 0.0)) azm = 0.0;
      #if rear_view
              else azm = atan2(traffic.position.y, traffic.position.x);
      #else
              else
              {
                 azm = atan2(traffic.position.y, traffic.position.x)/2.0;
                 if (azm < 0.0) azm = azm - PI/2.0;
480              else azm = azm + PI/2.0;
              }
      #endif
           azm1 = angle_convert(azm);
           if ( traffic.alt_known )
           {
              zdist = traffic.position.z * 2.0;
           }
           else
           {
490           zdist = 0.04;
              traffic.v_direction = none ;
           }
      #if 1.0 - rear_view
           for ( index = 0; index < 2; index++ )   /* place traffic symbol twice for full view */
           {
```

```
         #endif
           if ( distance < 0.25 )
           {
             if ((n == 1) && ((declutter>>2) == 1)) gmr_$line_color( dim_red, st );
500          else  gmr_$line_color( red, st );
             check( st );
             gmr_$fill_color( red, st ); check( st );
             gmr_$text_color( red, st ); check( st );
             azm2 = angle_convert(azm + .087*scale);    /* draw square for Resolution Advisory */
             azm4 = angle_convert(azm - .087*scale);
             p [0].x = cos(azm2);
             p [0].y = sin(azm2);
             p [0].z = zdist + .12*scale;
             p [1].x = cos(azm2);
510          p [1].y = sin(azm2);
             p [1].z = zdist - .12*scale;
             p [2].x = cos(azm4);
             p [2].y = sin(azm4);
             p [2].z = zdist - .12*scale;
             p [3].x = cos(azm4);
             p [3].y = sin(azm4);
             p [3].z = zdist + .12*scale;
             p [4] = p [0];
             gmr_$f3_polyline((short)4,p,true,st); check(st);
520          a_dist = .12*scale;
           }
         else if ( distance < 0.35 )
           {
             gmr_$fill_color( yellow, st ); check( st );
             if ((n == 1) && ((declutter>>2) == 1)) gmr_$line_color( dim_yellow, st );
             else  gmr_$line_color( yellow, st );
             check( st );
             gmr_$text_color( yellow, st ); check( st );
             azm2 = angle_convert(azm + .11*scale);     /* draw circle for Traffic Alert */
530          azm3 = angle_convert(azm + .0778*scale);
             p [0].x = cos(azm1);
             p [0].y = sin(azm1);
             p [0].z = zdist + .15*scale;
             p [1].x = cos(azm3);
             p [1].y = sin(azm3);
             p [1].z = zdist + .11*scale;
             p [2].x = cos(azm2);
             p [2].y = sin(azm2);
             p [2].z = zdist;
540          p [3].x = p[1].x;
             p [3].y = p[1].y;
             p [3].z = zdist - .11*scale;
             p [4].x = p[0].x;
             p [4].y = p[0].y;
             p [4].z = zdist - .15*scale;
             azm2 = angle_convert(azm - .11*scale);
             azm3 = angle_convert(azm - .0778*scale);
             p [5].x = cos(azm3);
             p [5].y = sin(azm3);
550          p [5].z = zdist - .11*scale;
             p [6].x = cos(azm2);
             p [6].y = sin(azm2);
             p [6].z = zdist;
             p [7].x = p[5].x;
             p [7].y = p[5].y;
```

```
                    p [7].z = zdist + .11*scale;
                    gmr_$f3_polyline((short)8,p,true,st); check(st);
                    azm2 = angle_convert(azm + .105*scale);
                    azm4 = angle_convert(azm - .105*scale);
560                 a_dist = .15*scale;
                }
                else
                {
                    gmr_$fill_color( cyan, st ); check( st );
                    if ((n == 1) && ((declutter>>2) == 1)) gmr_$line_color( dim_cyan, st );
                    else gmr_$line_color( cyan, st );
                    check( st );
                    gmr_$text_color( cyan, st ); check( st );
                    azm2 = angle_convert(azm + .123*scale);        /* draw diamond for normal traffic */
570                 azm3 = angle_convert(azm - .123*scale);
                    p [0].x = cos(azm1);
                    p [0].y = sin(azm1);
                    p [0].z = zdist + .15*scale;
                    p [1].x = cos(azm2);
                    p [1].y = sin(azm2);
                    p [1].z = zdist;
                    p [2].x = cos(azm1);
                    p [2].y = sin(azm1);
                    p [2].z = zdist - .15*scale;
                    p [3].x = cos(azm3);
580                 p [3].y = sin(azm3);
                    p [3].z = zdist;
                    p [4] = p [0];
                    gmr_$f3_polyline((short)4,p,true,st); check(st);
                    azm2 = angle_convert(azm + .11*scale);
                    azm4 = angle_convert(azm - .11*scale);
                    a_dist = .15*scale;
                }
            if (n == 0)
590         {
                /* put in question mark for unknown traffic */
                str_pos.x = 0.;
                str_pos.y = 0.;
                str_pos.z = 0.;
                gmr_$text( "", (short)1, str_pos, st ); check( st );
            if ( traffic.alt_known )
            {
              if ((declutter == 1) || (declutter == 3) || (declutter == 5))
              {
600             if (!(traffic.v_direction == none))
                {
                    if (traffic.v_direction == down) a_dist = -a_dist;
                    p [0].x = cos(azm1);
                    p [0].y = sin(azm1);
                    p [0].z = zdist + a_dist;
                    if (a_dist > 0) a_dist = a_dist - .09*scale;
                    else a_dist = a_dist + .09*scale;
                    azm3 = angle_convert(azm + .04*scale);
                    p [1].x = cos(azm3);
610                 p [1].y = sin(azm3);
                    p [1].z = zdist + a_dist;
                    azm3 = angle_convert(azm - .04*scale);
                    p [2].x = cos(azm3);
                    p [2].y = sin(azm3);
                    p [2].z = p [1].z;
```

```
            p [3] = p [0];
            gmr_$f3_polygon((short)3,p,st); check(st);
          }
        }
620   }
      else
      {
        /* put in question mark for unknown traffic */
        t_scale = .14*scale;
        gmr_$text_height( t_scale, st ); check( st );
        str_pos.x = cos(azm1);
        str_pos.y = sin(azm1) - t_scale*.26;
        str_pos.z = zdist - t_scale*.5;
        gmr_$text( "?", (short)1, str_pos, st ); check( st );
630   }
      azm1 = angle_convert(azm + .262*scale);
      azm3 = angle_convert(azm - .262*scale);
      p [1].x = cos(azm1);
      p [1].y = sin(azm1);
      p [1].z = zdist + .020*scale;
      p [2].x = cos(azm1);
      p [2].y = sin(azm1);
      p [2].z = zdist - .020*scale;
      p [3].x = cos(azm2);
640   p [3].y = sin(azm2);
      p [3].z = zdist - .020*scale;
      p [4].x = cos(azm2);
      p [4].y = sin(azm2);
      p [4].z = zdist + .020*scale;
      p [0] = p [4];
      if ( distance < 0.35 ) gmr_$f3_polygon((short)4,p,st);
      else gmr_$f3_polyline((short)4,p,false,st);
      check(st);
      p [0].x = cos(azm4);
650   p [0].y = sin(azm4);
      p [0].z = zdist + .020*scale;
      p [1].x = cos(azm3);
      p [1].y = sin(azm3);
      p [1].z = zdist + .020*scale;
      p [2].x = cos(azm3);
      p [2].y = sin(azm3);
      p [2].z = zdist - .020*scale;
      p [3].x = cos(azm4);
      p [3].y = sin(azm4);
      p [3].z = zdist - .020*scale;
660   p [4] = p [0];
      if ( distance < 0.35 ) gmr_$f3_polygon((short)5,p,st);
      else gmr_$f3_polyline((short)4,p,false,st);
      check(st);
    #if 1.0 - rear_view
      azm = azm + PI;
      }
    #endif
      }
670 }
    gmr_$line_type((short)1,st); check(st);
    }
```

```
/******************************************************************************
 *                                                                            *
 *   SCENE                                                                    *
 *                                                                            *
 *   PROCEDURE: GENERATES A COMPOSITE SCENE BY INSTANCING MULTIPLE AIRPLANES
 *                                                                            *
 *              AROUND MY ALTITUDE PLATEAU.                                   *
 *                                                                            *
 ******************************************************************************/
create_scene()
{
short        index;
traffic_t    unknown_alt[ max_traffic ];
auto boolean not_drawn     = true;
gmr_$f3_vector_t  p[6];

gmr_$fill_style( gmr_$fill_solid, st ); check( st );
680   gmr_$fill_color( cyan, st ); check( st );
      gmr_$fill_inten( (float)1.0, st ); check( st );
      gmr_$line_color( cyan, st ); check( st );
      gmr_$line_inten( (float)1.0, st ); check( st );
      gmr_$text_height( (float)0.08, st ); check( st );

for ( index = 0; index < traffic_cnt; index++ )
      {
         if ( (traffic[ index ].az_dist < 1.0) &&
             (((traffic[ index ].position.z < 0.90) &&
               (traffic[ index ].position.z > -0.9)) ||
690           !traffic[ index ].alt_known) )
         {
            if ( (traffic[ index ].az_dist < .334) && ( not_drawn ) )
            {
               draw_alt_plateau();
               not_drawn = false;
            }
            traffic_symbol( traffic[ index ], not_drawn );
         }
      }
700   if ( not_drawn )
      {
         draw_alt_plateau();
      }
   #if center_ref
      gmr_$line_color( white, st ); check( st );
      gmr_$line_inten( (float)1.0, st ); check( st );
      p[0].x = -0.12;
      p[0].y = 0.06;
      p[0].z = 0.005;
710   p[1].x = -0.12;
      p[1].y = 0.25;
      p[1].z = 0.005;
      p[2].x = -0.12;
      p[2].y = 0.25;
      p[2].z = -0.03;
      p[3].x = -0.12;
   #if rear_view
      p[3].y = 0.08;
      p[4].y = 0.08;
```

```
720 #else
        p[3].y = 0.1;
        p[4].y = 0.1;
    #endif
        p[3].z = -0.03;
        p[4].x = -0.12;
        p[4].z = -0.09;
        p[5].x = -0.12;
        p[5].y = 0.06;
        p[5].z = -0.09;
730     p[6] = p[0];
        gmr_$f3_polyline( (short)7, p, false, st ); check( st );
        p[0].y = -p[0].y;
        p[1].y = -p[1].y;
        p[2].y = -p[2].y;
        p[3].y = -p[3].y;
        p[4].y = -p[4].y;
        p[5].y = -p[5].y;
        p[6].y = -p[6].y;
        gmr_$f3_polyline( (short)7, p, false, st ); check( st );
740     p[0].x = 0.0;
        p[0].y = 0.02;
        p[0].z = 0.02;
        p[1].x = 0.0;
        p[1].y = 0.02;
        p[1].z = -0.02;
        p[2].x = 0.0;
        p[2].y = -0.02;
        p[2].z = -0.02;
        p[3].x = 0.0;
750     p[3].y = -0.02;
        p[3].z = 0.02;
        p[4] = p[0];
        gmr_$f3_polyline( (short)5, p, false, st ); check( st );
    #endif
    .}

/*********************************************************************************
 *                                                                               *
 *      UPDATE_TRAFFIC                                                           *
 *                                                                               *
 *      PROCEDURE:  UPDATES TRAFFIC POSITION BASED UPON TRAFFIC VELOCITY AND     *
 *                  ELAPSED_TIME.                                                *
 *                                                                               *
 *      PARAMS:     ELAPSED_TIME => TIME ELAPSED FROM LAST UPDATE_TRAFFIC CALL.  *
 *                                                                               *
 *********************************************************************************/
void    update_traffic( elapsed_time )
float   elapsed_time;
{
short       index;

760     for ( index = 0; index < traffic_cnt; index++ )
        {
            traffic[ index ].position.x += traffic[ index ].vx * elapsed_time;
            traffic[ index ].position.y += traffic[ index ].vy * elapsed_time;
            traffic[ index ].position.z += traffic[ index ].vz * elapsed_time;
            traffic[ index ].az_dist = azimuth_distance( traffic[ index ].position );
            if ( (traffic[ index ].az_dist >= 1.1 ) ||
```

```
              (traffic[ index ].position.z > 0.9) ||
              (traffic[ index ].position.z < -0.5) )
          {
770         traffic[ index ].contender = true;
            traffic[ index ].vx = -traffic[ index ].vx;
            traffic[ index ].vy = -traffic[ index ].vy;
            traffic[ index ].vz = -traffic[ index ].vz;
            if ( traffic[ index ].v_direction == up )
               traffic[ index ].v_direction = down;
            else
               if ( traffic[ index ].v_direction == down )
                  traffic[ index ].v_direction = up;
780       }
       }
    }
```

```
/*******************************************************************************
*                                                                              *
*     ANIMATE_SCENE                                                            *
*                                                                              *
*     PROCEDURE: CYCLES BETWEEN TWO BUFFERS AND SCENE STRUCTURES DISPLAYING THE
*                                                                              *
*                THE TRAFFIC SYMBOLOGY WITH UPDATED TCAS DATA.  IN OTHER WORDS *
*                THE LITTLE PLANES MOVE AROUND.                                *
*                                                                              *
*******************************************************************************/ animate_scene()
{
    gmr_$dbuff_inq_select_buffer( vpid, inq_buffer, st ); check( st );
    if ( inq_buffer == gmr_$1st_buffer )
    {
        gmr_$viewport_set_structure( vpid, scene1_id, st ); check( st );
        gmr_$viewport_refresh( vpid, st ); check( st );
790     gmr_$dbuff_set_display_buffer( gmr_$1st_buffer, vpid, st ); check( st );
        gmr_$dbuff_set_select_buffer( gmr_$2nd_buffer, vpid, st ); check( st );
#if rear_view
        gmr_$viewport_set_structure( vpid_2, scene1_id, st ); check( st );
#endif
        gmr_$4x3_matrix_identity (mat,st);
        gmr_$4x3_matrix_scale(gmr_$mat_replace, RV_scale, mat, st); check (st);
#if rear_view
        gmr_$viewport_set_global_matrix (vpid_2, mat, st); check (st);
        gmr_$viewport_refresh( vpid_2, st ); check( st );
800     gmr_$dbuff_set_display_buffer( gmr_$1st_buffer, vpid_2, st ); check( st );
        gmr_$dbuff_set_select_buffer( gmr_$2nd_buffer, vpid_2, st ); check( st );
#endif
        gmr_$structure_open( scene2_id, false, st ); check( st );
    }
    else
    {
        gmr_$viewport_set_structure( vpid, scene2_id, st ); check( st );
        gmr_$viewport_refresh( vpid, st ); check( st );
        gmr_$dbuff_set_display_buffer( gmr_$2nd_buffer, vpid, st ); check( st );
810     gmr_$dbuff_set_select_buffer( gmr_$1st_buffer, vpid, st ); check( st );
#if rear_view
        gmr_$viewport_set_structure( vpid_2, scene2_id, st ); check( st );
#endif
```

```
            gmr_$4x3_matrix_identity (mat,st);
            gmr_$4x3_matrix_scale(gmr_$mat_replace, RV_scale, mat, st); check (st);
#if rear_view
            gmr_$viewport_set_global_matrix (vpid_2, mat, st); check (st);
            gmr_$viewport_refresh( vpid_2, st ); check( st );
            gmr_$dbuff_set_display_buffer( gmr_$2nd_buffer, vpid_2, st ); check( st );
820         gmr_$dbuff_set_select_buffer( gmr_$1st_buffer, vpid_2, st ); check( st );
#endif
            gmr_$structure_open( scene1_id, false, st ); check( st );
        }
        gmr_$structure_erase( st ); check( st );
        create_scene();
        gmr_$structure_close( true, st ); check( st );
    }
```

```
/**********************************************
*                                             *
*    EVENTS: ENABLE AND PROCESS EVENTS        *
*                                             *
**********************************************/ events()
        #define     system_resolution  0.000004
830     #define     set_size 256
        {
        time_$clock_t           clock1, clock2;
        gmr_$event_t            type;
        char                    data;
        gmr_$keyset_t           keyset;
        static gmr_$f3_point_t  old_pos     = { 0.5, 0.5, 0.0 };
        static gmr_$f3_point_t  current_pos = { 0.5, 0.5, 0.0 };
        static float            elapsed_time = 0.0;
        static boolean          on          = true;
840     static boolean          pause       = false;
        static boolean          ok          = true;

/*** POSITION CURSOR AND THEN TURN IT OFF ***/
        gmr_$cursor_set_position( current_pos, st ); check( st );
        gmr_$cursor_set_active( false, st ); check( st );

lib_$init_set( keyset, set_size );

#if dual_demo

/*** ENABLE THE Q(UIT) KEY ***/
        lib_$add_to_set( keyset, set_size, 'q' );
        lib_$add_to_set( keyset, set_size, 'Q' );
        lib_$add_to_set( keyset, set_size, ' ' );
        lib_$add_to_set( keyset, set_size, 'd' );
850     lib_$add_to_set( keyset, set_size, 'p' );
        lib_$add_to_set( keyset, set_size, 't' );

gmr_$input_enable( gmr_$keystroke, keyset, st ); check( st );

/*** READ CONSUMER EVENTCOUNT TO USE AS TRIGGER VALUE NEXT TIME ***/
        consumer_wait_value = ec2_$read( shared_info->consumer_ec );
```

```
            gmr_$input_event_wait( false, type, data, current_pos, st ); check( st );
            time_$clock( clock2 );
            while ( on )
            {
                clock1 = clock2;
                if ( !pause )
860             {
                    update_traffic(elapsed_time);
                    sort_traffic();
                    animate_scene();

/*** GIVE CONSUMER THE GO AHEAD ***/
                    ec2_$advance(shared_info->producer_ec, st ); check( st );
                    shared_info->been_here = true;

/** WAIT FOR CONSUMER TO GET HIS WORK DONE ***/
                    ++consumer_wait_value;
                    i = ec2_$wait( &(shared_info-> consumer_ec ),  /* ptr to eventcount  */
                            consumer_wait_value,        /* trigger value     */
                            (short)1,                   /* no. of eventcounts */
870                         st ); check( st );
                }
                if ( type == gmr_$keystroke )
                {
                    switch( (data & 0xff) )
                    {
                        case 'q'                :
                        case 'Q'                : on = false;
                                                  shared_info->been_here = false;
                                                  ec2_$advance(shared_info->producer_ec, st ); check( st );
                                                  break;
880                     case ' '                : pause = !pause;
                                                  break;
                        case 'd'                : declutter = declutter + 1;
                                                  if (declutter > 5) declutter = 0;
                                                  break;
                        case 't'                : traffic_cnt = traffic_cnt + 1;
                                                  if (traffic_cnt > max_traffic) traffic_cnt = 1;
                                                  break;
                        case 'p'                : gmr_$print_display("tcas_wp.post",
                                (short)12,gmr_$postscript,(float)8.5,(float)11.0,st), check(st);
890                                               pause = !pause;
                                                  break;
                    }
                } gmr_$input_event_wait(false, type, data, current_pos, st);  check( st );
            }
    #else
            lib_$add_to_set( keyset, set_size, 'a' );
            lib_$add_to_set( keyset, set_size, 'A' );
            lib_$add_to_set( keyset, set_size, 'b' );
            lib_$add_to_set( keyset, set_size, 'd' );
900         lib_$add_to_set( keyset, set_size, ' ' );
            lib_$add_to_set( keyset, set_size, 'p' );
            lib_$add_to_set( keyset, set_size, 't' );

gmr_$input_enable( gmr_$buttons, keyset, st ); check( st );
```

```c
/* Enable keyboard */
    lib_$add_to_set( keyset, set_size, 'q' );
    lib_$add_to_set( keyset, set_size, 'Q' );

gmr_$input_enable( gmr_$keystroke, keyset, st ); check( st );

gmr_$input_event_wait( false, type, data, current_pos, st ); check( st );
    time_$clock( clock2 );
    while ( on )
910 {
        clock1 = clock2;
        if ( type == gmr_$keystroke )
        {
            switch( (data & 0xff) )
            {
                case 'q'            :
                case 'Q'            : on = false;
                                      break;
                case ' '            : pause = !pause;
                                      break;
920
                case 'd'            : declutter = declutter + 1;
                                      if (declutter > 5) declutter = 0;
                                      break;
                case 't'            : traffic_cnt = traffic_cnt + 1;
                                      if (traffic_cnt > max_traffic) traffic_cnt = 1;
                                      break;
                case 'p'            : gmr_$print_display("tcas_wp.post",
                        (short)12,gmr_$postscript,(float)8.5,(float)11.0,st), check(st);
                                      pause = !pause;
                                      break;
930
            }
        }
        if ( type == gmr_$buttons )
        {
            switch( (data & 0xff) )
            {
                case 'a'  : ok = false;
                            break;
                case 'A'  : ok = true;
940                         break;
                case 'b'  : deltax = 0.0;
                            deltay = 0.0;
                            deltaz = 0.0;
                            break;
            }
        }
        if ( ok )
        {
            gmr_$cursor_inq_position( current_pos, st ); check( st );
950         if (( current_pos.x > (old_pos.x + (float)0.02) ) && ( deltay > -0.01 ))
                deltay -= (float)0.0005;
            else if (( current_pos.x < (old_pos.x - (float)0.02) ) && ( deltay < 0.01 ))
                deltay += (float)0.0005;
            if (( current_pos.y > (old_pos.y + (float)0.02) ) && ( deltaz < 0.01 ))
                deltaz += (float)0.0005;
            else if (( current_pos.y < (old_pos.y - (float)0.02) ) && ( deltaz > -0.01 ))
                deltaz -= (float)0.0005;
        }
        else
```

```
960         {
            gmr_$cursor_inq_position( current_pos, st ); check( st );
            if (( current_pos.y > (old_pos.y + (float)0.02) ) && ( deltax < 0.01 ))
                deltax += (float)0.0005;
            else if (( current_pos.y < (old_pos.y - (float)0.02) ) && ( deltax > -0.01 ))
                deltax -= (float)0.0005;
            } gmr_$cursor_set_position( old_pos, st ); check( st );
            if ( !pause )
            {
970             update_traffic(elapsed_time);
                sort_traffic();
                animate_scene();
            }
            gmr_$input_event_wait(false, type, data, current_pos, st); check( st );
            time_$clock( clock2 );
            elapsed_time = (float)( ( clock2.c2.low32 - clock1.c2.low32 ) * system_resolution );
        } endif
        }
        /***********************************************************************
        *                                                                      *
        *     VIEWING_PARAMS                                                   *
        *                                                                      *
        *     PROCEDURE: GIVEN A VIEWPORT_ID CERTAIN VIEWING PARAMETERS ARE DEFINED
        *                                                                      *
        *                                                                      *
        ***********************************************************************/

980     viewing_params( vpid , vpid_2)
        gmr_$viewport_id_t     vpid, vpid_2;
        {
            gmr_$view_set_reference_point( vpid, ref_point, st ); check( st );
            gmr_$view_set_view_plane_normal( vpid, normal, st ); check( st );
            gmr_$view_set_up_vector( vpid, up_vec, st ); check( st );
            gmr_$view_set_view_distance( vpid, v_dist, st ); check( st );
            gmr_$view_set_hither_distance( vpid, h_dist, st ); check( st );
            gmr_$view_set_yon_distance( vpid, y_dist, st ); check( st );
            gmr_$view_set_window( vpid, window, st ); check( st );
990         gmr_$view_set_projection_type( vpid, proj, st ); check( st );
            gmr_$view_set_coord_system( vpid, coord_sys, st ); check( st );
            gmr_$viewport_set_shading_mode( vpid, gmr_$shading_attrib, gmr_$render_filled,
                            gmr_$hs_no_hidden_surface, st ); check( st );
        #if rear_view
            gmr_$view_set_reference_point( vpid_2, ref_point_2, st ); check( st );
            gmr_$view_set_view_plane_normal( vpid_2, normal_2, st ); check( st );
            gmr_$view_set_up_vector( vpid_2, up_vec_2, st ); check( st );
            gmr_$view_set_view_distance( vpid_2, v_dist_2, st ); check( st );
            gmr_$view_set_hither_distance( vpid_2, h_dist_2, st ); check( st );
            gmr_$view_set_yon_distance( vpid_2, y_dist_2, st ); check( st );
1000        gmr_$view_set_window( vpid_2, window_2, st ); check( st );
            gmr_$view_set_projection_type( vpid_2, proj, st ); check( st );
            gmr_$view_set_coord_system( vpid_2, coord_sys_2, st ); check( st );
            gmr_$viewport_set_shading_mode( vpid_2, gmr_$shading_attrib, gmr_$render_filled,
                            gmr_$hs_no_hidden_surface, st ); check( st );
        #endif
        }
```

```
/*****************************************************************************
 *                                                                           *
 *       MAINLINE                                                            *
 *                                                                           *
 *****************************************************************************/ main()
{
  #if dual_demo

/* MAP THE SHARED DATA FILE CONTAINING THE EVENTCOUNTS */ shared_info = (shared_info_t *)  /* typecast returned pointer */

1010   ms_$mapl("shared_file",      /* object to be mapped     */
               (short)11,            /* length of name          */
               0L,                   /* first byte to map       */
               (long)sizeof(shared_info_t), /* no. bytes to map */
               ms_$cowriters,        /* locking mode            */
               ms_$wr,               /* access type             */
               true,                 /* map length in 3rd       */
                                     /* parameter, even if      */
                                     /* object is shorter       */
               length_mapped,        /* bytes mapped - returned */
1020           st ); check( st );

/*** INITIALIZE THE EVENTCOUNTS AND THE BEEN_HERE START FLAG ***/
  ec2_$init(shared_info->producer_ec);
  ec2_$init(shared_info->consumer_ec);
  shared_info->been_here = false;
  #endif /* INITIALIZE THE PACKAGE AND OPEN THE FILE */
  gmr_$init( gmr_$direct, stream_$stdout, bitmap_size, plane_cnt, st ); check( st );
  gmr_$file_create( "tcas_w.gm", 9, gmr_$overwrite, gmr_$1w, file_id, st ); check( st );

gmr_$dm_refresh_entry( dm_refresh, st ); check( st );

set_color();
  init_traffic();
1030   sort_traffic();

/*** CREATE A CIRCLE OF UNIT RADIUS IN THE X-Y PLANE ***/
  gmr_$structure_create( "", 0, circle_id, st ); check( st );
  polygon( 40 );
  gmr_$structure_close( true, st ); check( st );

/*** CREATE CONCENTRIC CIRCLES IN THE X-Y PLANE WITH THE OUTER MOST CIRCLE OF UNIT
RADIUS ***/
  gmr_$structure_create( "", 0, circles_id, st ); check( st );
  circles( num_of_circs );
  gmr_$structure_close( true, st ); check( st );

/*** CREATE SPOKES OF UNIT LENGTH LYING IN THE X-Y PLANE RADIATING OUT FROM THE
ORIGIN ***/
  gmr_$structure_create( "", 0, spokes_id, st ); check( st );
  inner_radius = (float)( 1.0 / num_of_circs );
  spokes( num_of_spokes, inner_radius );
1040   gmr_$structure_close( true, st ); check( st );
```

```
/*** CREATE MY ALTITUDE PLATEAU BY INSTANCING THE SPOKES ON THE CIRCLES ***/
    gmr_$structure_create( "", 0, my_alt_id, st ); check( st );
    my_alt_plateau();
    gmr_$structure_close( true, st ); check( st );

/*** CREATE A VIEWPORT AND SELECT BUFFER #1 TO BE UPDATED ***/
    gmr_$viewport_create( obj_vp_ldc, vpid, st ); check( st );
    #if rear_view
    gmr_$viewport_create( obj_vp_ldc_2, vpid_2, st ); check( st );
    #endif
    gmr_$dbuff_set_mode( buffer_mode, st ); check( st );
    gmr_$dbuff_set_select_buffer( gmr_$1st_buffer, vpid, st ); check( st );
1050 #if rear_view
    gmr_$dbuff_set_select_buffer( gmr_$1st_buffer, vpid_2, st ); check( st );
    #endif
    /*** CREATE THE FIRST SCENE ***/
    gmr_$structure_create( "", 0, scene1_id, st ); check( st );
    create_scene();
    gmr_$structure_close( true, st ); check( st );

/*** SETUP THE DESIRED VIEWING PARAMETERS ***/
    viewing_params( vpid, vpid_2 );

/*** CREATE THE SECOND SCENE STRUCTURE ***/
    gmr_$structure_create( "", 0, scene2_id, st );
    gmr_$structure_close( true, st ); check( st );

/*** GO TO THE EVENTS PROCEDURE TO READ DATA FROM MOUSE AND UPDATE TRAFFIC ***/
    events();

/*** CLEAN UP AND EXIT ***/
1060 gmr_$file_close( true, st ); check( st );
    #if dual_demo
    ms_$unmap( shared_info,
               length_mapped,
               st ); check( st );
    #endif
    gmr_$terminate( st ); check( st );
```

I claim:

1. A traffic information display format apparatus, presented in a three-dimensional perspective and situated in an own craft, for observing traffic in a volume about said own craft, comprising:

a first grid, representing a forward view from said own craft, comprising:
  a first set of approximately parallel grid lines spaced so as to represent different values of altitude relative to said own craft;
  a second set of approximately parallel grid lines, overlapping said said first set of grid lines, wherein each of said first set of grid lines is approximately perpendicular to each of said second set of grid lines, and each of said second set of grid lines is spaced so as to represent a particular value of azimuth relative to a heading of said own craft;
  a reference symbol on said first grid, situated at one intersection of one of said first set of grid lines and one of said second grid lines, representing a location of said own craft on said first grid; and
  at least one traffic symbol representing a traffic entity, said symbol located on said first grid at a location so as to indicate altitude and azimuth of the traffic entity relative to said own craft, and having a first dimension approximately parallel to said first set of grid lines, that indicates distance of the traffic entity from said own craft, having a second dimension approximately parallel to said second set of grid lines, and having an orientation that indicates whether the traffic entity is ascending, descending or remaining constant in altitude relative to own craft or has an unknown altitude; and a second grid representing a rearward view from said own craft, comprising:
  a first set of approximately parallel grid lines spaced so as to represent different values of altitude relative to said own craft;
  a second set of approximately parallel grid lines, overlapping said said first set of grid lines, wherein each of said first set of grid lines is approximately perpendicular to each of said second set of grid lines, and each of said second set of grid lines is spaced so as to represent a particular value of azimuth relative to a heading of said own craft;

a reference symbol on said second grid, situated at one intersection of one of said first set of grid lines and one of said second grid lines, representing a location of said own craft on said second grid; and at least one traffic symbol representing a traffic entity, said symbol located on said second grid at a location so as to indicate altitude and azimuth of the traffic entity relative to said own craft, and having a first dimension approximately parallel to said first set of grid lines, that indicates distance of the traffic entity from said own craft, and having a second dimension approximately parallel to said second set of grid lines, wherein the second dimension in combination with the first dimension forms the symbol having a particular shape and orientation that indicates whether the traffic entity is ascending, descending or remaining constant in altitude relative to own craft or has an unknown altitude; and wherein:

said first sets of grid lines, each first set having a middle line horizontal relative to a viewer of said first and second grids and representing an altitude of said own craft, are cylindrically shaped in a fashion that the remaining lines gradually disperse in directions slightly away from the middle horizontal lines of said first and second grids;

said reference symbols are situated on the respective middle horizontal lines;

the first dimension of each of said traffic symbols is a width of each said symbol, greater width indicating closer distance of the traffic entity to said own craft and narrower width indicating farther distance of the traffic entity from said own craft;

the second dimension of each of said traffic symbols being variable in that an extension of the second dimension in one direction indicates an ascending in altitude of the traffic entity and that an extension of the second dimension in another direction indicates a descending of the traffic entity;

each of said traffic symbols is variable in shape in that one shape indicates a known altitude of the traffic entity and another shape indicates an unknown altitude of the traffic entity;

each of said traffic symbols is variable in color in that a particular color indicates a particular status of the traffic entity.

2. Apparatus of claim 1 wherein each of said traffic symbols exhibits a characteristic in shape that indicates whether the represented traffic entity is approaching towards or receding from said own craft.

3. Apparatus of claim 2 wherein:

location of each of said traffic symbols relative to said first set of grid lines, indicates an altitude of the respective traffic entity relative to said own craft, wherein each grid line represents a particular altitude value; and location of each of said traffic symbols relative to said second set of grid lines, indicates an azimuth of the respective traffic entity relative to said own craft, wherein each grid line represents a particular azimuth value.

4. Apparatus of claim 3 wherein each of the second set of grid lines is straight and equidistant to another grid line.

5. Apparatus of claim 4 wherein:

each traffic symbol has a bar-shaped figure approximately parallel to said first sets of grid lines;

each bar-shaped figure has a geometrically-shaped figure superimposed on it;

a first geometrically-shaped figure situated above of the bar relative to the viewer indicates ascending altitude of a represented traffic entity;

the first geometrically-shaped figure situated below the bar relative to the viewer indicates descending altitude of a represented traffic entity;

a second geometrically-shaped figure situated above the bar indicates constant altitude of a represented traffic entity; and the second geometrically-shaped figure situated below the bar indicates an unknown altitude of a represented traffic entity.

6. Apparatus of claim 5 wherein:

each geometrically-shaped figure having a first color indicates a resolution alert; and each geometrically-shaped figure having a second color indicates a traffic alert.

* * * * *